(12) United States Patent
Jung et al.

(10) Patent No.: US 11,726,672 B2
(45) Date of Patent: Aug. 15, 2023

(54) OPERATING METHOD OF STORAGE DEVICE SETTING SECURE MODE OF COMMAND, AND OPERATING METHOD OF STORAGE SYSTEM INCLUDING THE STORAGE DEVICE

(71) Applicant: SAMSUNG ELECTRONICS CO., LTD., Suwon-si (KR)

(72) Inventors: Daejin Jung, Suwon-si (KR); Dong-Min Kim, Hwaseong-si (KR); Jeong-Woo Park, Hwaseong-si (KR); Kyoung Back Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/505,064

(22) Filed: Oct. 19, 2021

(65) Prior Publication Data
US 2022/0206693 A1  Jun. 30, 2022

(30) Foreign Application Priority Data

Dec. 24, 2020 (KR) .......................... 10-2020-0183559
May 14, 2021 (KR) .......................... 10-2021-0063018

(51) Int. Cl.
*G06F 3/06* (2006.01)

(52) U.S. Cl.
CPC ............ *G06F 3/0622* (2013.01); *G06F 3/064* (2013.01); *G06F 3/0629* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 7,376,010 B2 | 5/2008 | Tanaka et al. |
| 7,739,467 B2 | 6/2010 | Oshikiri |
| 9,087,210 B2 | 7/2015 | Baryudin et al. |
| (Continued) | | |

FOREIGN PATENT DOCUMENTS

KR    10-2016-0019780 A    2/2016

OTHER PUBLICATIONS

Communication dated Apr. 12, 2022, issued by the European Patent Office in counterpart European Application No. 21207631.9.

*Primary Examiner* — Edward J Dudek, Jr.
*Assistant Examiner* — Ralph A Verderamo, III
(74) *Attorney, Agent, or Firm* — Sughrue Mion, PLLC

(57) ABSTRACT

Provided is a storage device which communicates with a host device and configured to set a secure mode of a plurality of commands different in kind. An operating method of the storage device includes receiving a secure request indicating a protection of a first command and a protection of a second command of the plurality of commands, from the host device; setting a secure mode of the first and second commands, based on the secure request; receiving a first request indicating a request to execute the first command, from the host device; outputting a first response indicating failure of the first command to the host device, based on the first request; receiving a second request indicating a request to execute the second command, from the host device; and outputting a second response indicating failure of the second command to the host device, based on the second request.

20 Claims, 21 Drawing Sheets

(56) References Cited

U.S. PATENT DOCUMENTS

| | | | |
|---|---|---|---|
| 9,678,760 B2 | 6/2017 | Lee et al. | |
| 9,753,869 B2 | 9/2017 | Baryudin et al. | |
| 10,257,192 B2 | 4/2019 | Shin et al. | |
| 10,725,687 B1* | 7/2020 | Sela | G06F 12/14 |
| 10,783,090 B2 | 9/2020 | Lee et al. | |
| 2015/0286585 A1 | 10/2015 | Caraccio et al. | |
| 2015/0324304 A1* | 11/2015 | Baryudin | G06F 21/78 726/17 |
| 2019/0266096 A1* | 8/2019 | Lee | G06F 3/061 |
| 2019/0303304 A1 | 10/2019 | Lee et al. | |
| 2020/0014544 A1* | 1/2020 | Sela | G06F 21/79 |
| 2020/0192824 A1 | 6/2020 | Wang et al. | |
| 2020/0210596 A1 | 7/2020 | Cariello et al. | |

\* cited by examiner

FIG. 6

<RPMB message component>

| Field Name | Length(Bytes) | Description |
|---|---|---|
| Request Message Type | 2 | Define a request message type |
| Response Message Type | 2 | Define a response message type |
| Authentication Key | 32 | It is used for programming an authentication key |
| MAC | 32 | Message authentication code |
| Result | 2 | Describe an operation result |
| Write Counter | 4 | Total amount of successful authenticated data write operations |
| Address | 2 | Logical block address of data to be programmed to or read from a RPMB region |
| Nonce | 16 | Random number generated by the host |
| Data | 256 | Data to be written or read |
| Block Count | 2 | Number of 256-bytes logical blocks requested to be read or programmed |

Supporting SCPCB: { Request Message Type, Response Message Type }

FIG. 7A

| Code | Request Message Types |
|---|---|
| 0001h | Authentication key programming request |
| 0002h | Write counter read request |
| 0003h | Authenticated data write request |
| 0004h | Authenticated data read request |
| 0005h | Result read request |
| 0006h | Secure write protect configuration block write request |
| 0007h | Secure write protect configuration block read request |
| 0008h | Secure command protect configuration block write request |
| 0009h | Secure command protect configuration block read request |
| Others | Reserved |

Defined types for supporting SCPCB: 0008h, 0009h

FIG. 7B

| Code | Response Message Types |
|------|------------------------|
| 0100h | Authentication key programming response |
| 0200h | Write counter read response |
| 0300h | Authenticated data write response |
| 0400h | Authenticated data read response |
| 0500h | Reserved |
| 0600h | Secure write protect configuration block write response |
| 0700h | Secure write protect configuration block read response |
| 0800h | Secure command protect configuration block write response |
| 0900h | Secure command protect configuration block read response |
| Others | Reserved |

Defined types for supporting SCPCB: 0800h, 0900h

FIG. 9

<SCPCB write request based on RPMB message>

| Offset | Field Name | Value |
|---|---|---|
| 0:195 | Stuff Bytes | 0...00h |
| 196:227 | MAC/Authentication Key | MAC from host |
| 228:483 | Data | SCPCB |
| 484:499 | Nonce | 0...00h |
| 500:503 | Write Counter | Current Counter Value |
| 504:505 | Address | 0...00h |
| 506:507 | Block Count | 0001h |
| 508:509 | Result | 0...00h |
| 510:511 | Request Message Type | 0008h |

FIG. 10

<Secure Command Protect Configuration Block (SCPCB)>

| Bit<br>Byte | 7 | 6 | 5 | 4 | 3 | 2 | 1 | 0 |
|---|---|---|---|---|---|---|---|---|
| 0 | Index |||||||||
| 1 | Data Length |||||||||
| 2<br>⋮<br>21 | 1st secure command protect entry |||||||||
| 22<br>⋮<br>41 | 2nd secure command protect entry |||||||||
| 42<br>⋮<br>61 | 3rd secure command protect entry |||||||||
| 62<br>⋮<br>81 | 4th secure command protect entry |||||||||
| 82<br>⋮<br>255 | Reserved |||||||||

FIG. 11

<Index of SCPCB>

| Index[7:6] | Index[5:0] | Description |
|---|---|---|
| 00b | LU | Index for LU protection operation in a unit of LBA, 1st to 4th secure command protect entries are used for each of the 1st to 4th LBAs of same LU |
| 01b | LU | Index for LU protection operation, 1st secure command protect entry is used |
| 10b | MT | Index for MT protection operation, 1st secure command protect entry is used |
| 11b | 000000b | Reserved |

FIG. 12

<Secure command protect entry of SCPCB>

| Bit\Byte | 7 | 6 | 5 | 4 | 3 | 2 | 1 | 0 |
|---|---|---|---|---|---|---|---|---|
| 0 | Reserved | | | | | | Command protect type (CPT) | |
| 1 | Command protect flag (CPF) | | | | | | | |
| ... | | | | | | | | |
| 7 | | | | | | | | |
| 8 (MSB) | Logical block address | | | | | | | |
| ... | | | | | | | | |
| 15 (LSB) | | | | | | | | |
| 16 (MSB) | Number of logical blocks | | | | | | | |
| ... | | | | | | | | |
| 19 (LSB) | | | | | | | | |

FIG. 13

<Command protect type (CPT) of secure command protect entry>

| Code | Description |
|---|---|
| 00b | CPF bit is persistent through power cycle or hardware reset. A value of CPF bit may only be changed by SCPCB write request. |
| 01b | CPF bit is automatically cleared to 0b after power cycle or hardware reset. |
| 10b | CPF bit is automatically set to 1b after power cycle or hardware reset. |
| 11b | Reserved |

FIG. 14

<Command protect flag (CPF) of secure command protect entry>

| Bit | Field | Code | description for code value |
|---|---|---|---|
| 8 | Read protection | 0b or 1b | 0b: read command protection is disabled<br>1b: read command protection is enabled |
| 9 | Write protection | 0b or 1b | 0b: write command protection is disabled<br>1b: write command protection is enabled |
| 10 | Purge protection | 0b or 1b | 0b: purge command protection is disabled<br>1b: purge command protection is enabled |
| 11 | Unmap protection | 0b or 1b | 0b: unmap command protection is disabled<br>1b: unmap command protection is enabled |
| ... | ... | ... | ... |
| 63 | Other command protection, or reserved | 0b or 1b, or reserved | 0b: other command protection is disabled, or reserved<br>1b: other command protection is enabled, or reserved |

OPERATING METHOD OF STORAGE DEVICE SETTING SECURE MODE OF COMMAND, AND OPERATING METHOD OF STORAGE SYSTEM INCLUDING THE STORAGE DEVICE

CROSS-REFERENCE TO THE RELATED APPLICATIONS

This application claims priority under 35 U.S.C. § 119 to Korean Patent Application Nos. 10-2020-0183559 filed on Dec. 24, 2020 and 10-2021-0063018 filed on May 14, 2021, in the Korean Intellectual Property Office, the disclosures of which are incorporated by reference herein in their entireties.

BACKGROUND

Example embodiments of the disclosure described herein relate to secure of a storage device, and more particularly, relate to an operating method of a storage device to set a secure mode of a command, and an operating method of a storage system including the storage device.

A memory device stores data in response to a write request and outputs data stored therein in response to a read request. For example, the memory device is classified as a volatile memory device, which loses data stored therein when a power supply is interrupted, such as a dynamic random access memory (DRAM), a static RAM (SRAM), or a non-volatile memory device, which retains data stored therein even when a power supply is interrupted, such as a flash memory device, a phase-change RAM (PRAM), a magnetic RAM (MRAM), or a resistive RAM (RRAM).

The non-volatile memory device may store important (or critical) data (e.g., an authentication key and a password) of a user. To prevent a malicious user to access the important data, the non-volatile memory device may support a replay protect memory block (RPMB). When a secure mode is set in the RPMB, the access of the malicious user may be blocked. As requirements for secure of a storage system diversify, there is a need for a function of protecting various kinds of commands and a function of protecting various ranges of memory regions according to a user's intent.

SUMMARY

Example embodiments of the disclosure provide an operating method of a storage device to set a secure mode of a command, and an operating method of a storage system including the storage device.

According to an aspect of an example embodiment, provided is a method of operating a storage device to set a secure mode of a plurality of commands, the method including: receiving a secure request indicating a protection of a first command and a protection of a second command, from a host device configured to communicate with the storage device, the first command and the second command being different in kind; setting secure modes of the first command and the second command, based on the secure request; receiving a first request indicating a request to execute the first command, from the host device; outputting a first response indicating a failure of the first command to the host device, based on the first request; receiving a second request indicating a request to execute the second command, from the host device; and outputting a second response indicating a failure of the second command to the host device, based on the second request.

According to an aspect of an example embodiment, provided is a method of operating a storage device to set a secure mode in a plurality of logical units (LUs), the method including: receiving a secure request indicating a protection of a first command in a first LU and a second LU of the plurality of LUs, from a host device configured to communicate with the storage device; setting a secure mode of the first command in the first LU and the second LU, based on the secure request; receiving a first request indicating a request to execute the first command in the first LU, from the host device; outputting a first response indicating a failure of the first command in the first LU to the host device, based on the first request; receiving a second request indicating a request to execute the first command in the second LU, from the host device; and outputting a second response indicating a failure of the first command in the second LU to the host device, based on the second request.

According to an aspect of an example embodiment, provided is a method of operating a storage system, which includes a host device and a storage device configured to communicate with the host device, to set a secure mode of a plurality of commands, the method including: generating, by the host device, a secure request indicating a protection of a first command in a first logical block address (LBA) and a protection of a second command in a second LBA, the first command and the second command being different in kind; setting, by the storage device, a secure mode based on the secure request; generating, by the host device, a first request indicating a request to execute the first command in the first LBA; generating, by the storage device, a first response indicating a failure of the first command, based on the first request; generating, by the host device, a second request indicating a request to execute the second command in the second LBA; and generating, by the storage device, a second response indicating a failure of the second command, based on the second request.

BRIEF DESCRIPTION OF THE FIGURES

The above and other objects and features of the disclosure will become apparent by describing in detail example embodiments thereof with reference to the accompanying drawings.

FIG. 6 is a diagram for describing a relay protect memory block (RPMB) message, according to some example embodiments of the disclosure.

FIG. 7A is a diagram illustrating a request message type of FIG. 6 in detail, according to some example embodiments of the disclosure.

FIG. 7B is a diagram illustrating a response message type of FIG. 6 in detail, according to some example embodiments of the disclosure.

FIG. 9 is a diagram illustrating a secure command protect configuration block write request of FIG. 8 in detail, according to some example embodiments of the disclosure.

FIG. 10 is a diagram illustrating a secure command protect configuration block of FIG. 9 in detail, according to some example embodiments of the disclosure.

FIG. 11 is a diagram illustrating an index of FIG. 10 in detail, according to some example embodiments of the disclosure.

FIG. 12 is a diagram illustrating a secure command protect entry of FIG. 10 in detail, according to some example embodiments of the disclosure.

FIG. 13 is a diagram illustrating a command protect type of FIG. 12 in detail, according to some example embodiments of the disclosure.

FIG. 14 is a diagram illustrating a command protect flag of FIG. 12 in detail, according to some example embodiments of the disclosure.

DETAILED DESCRIPTION

Below, example embodiments of the disclosure will be described in detail and clearly to such an extent that one skilled in the art easily carries out the disclosure.

Components described in the detailed description with reference to terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
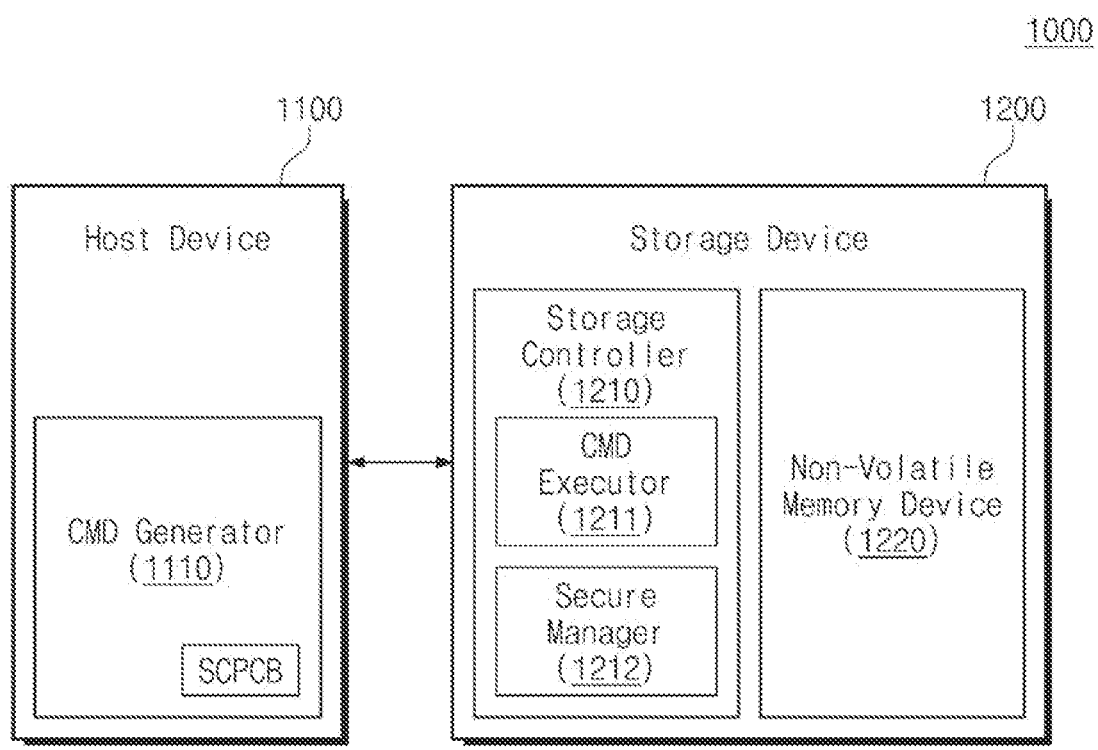
FIG. 1 is a block diagram of a storage system according to an example embodiment of the disclosure.

FIG. 1 is a block diagram of a storage system according to an example embodiment of the disclosure. Referring to FIG. 1, a storage system 1000 may include a host device 1100 and a storage device 1200. In some example embodiments, the storage system 1000 may be a computing system, which is configured to process a variety of information, such as a personal computer (PC), a notebook, a laptop, a server, a workstation, a tablet PC, a smartphone, a digital camera, and a black box.

The host device 1100 may control overall operations of the storage system 1000. For example, the host device 1100 may store data in the storage device 1200 or may read data stored in the storage device 1200. In some example embodiments, the host device 1100 may communicate with the storage device 1200 in compliance with a universal flash storage (UFS) interface.

The host device 1100 may include a command generator 1110. The command generator 1110 may generate a command indicating an operation to be performed at the storage device 1200. The command generated by the command generator 1110 may be sent to the storage device 1200.

For example, the command generator 1110 may generate various kinds of commands such as a read command, a write command, a purge command, and an unmap command. The read command may indicate an operation of reading data stored in the storage device 1200. The write command may indicate an operation of writing data in the storage device 1200. The purge command may indicate an operation of physically erasing data stored in the storage device 1200. The unmap command may indicate an operation of deleting logical-to-physical mapping information, which corresponds to a relationship between a logical address and a physical address, in the storage device 1200.

In some example embodiments, the command generator 1110 may support a secure command protect configuration block SCPCB. For example, the command generator 1110 may generate a secure request including the secure command protect configuration block SCPCB, which is implemented with a replay protect memory block (RPMB) message of the UFS standard. The secure command protect configuration block SCPCB may include information of a secure mode of various commands for each memory region (e.g., a logical block address (LBA) or a logical unit (LU)). The secure mode may control whether a command is executable. For example, the execution of a command in which the secure mode is enabled may be blocked. The secure command protect configuration block SCPCB will be described in more detail with reference to FIGS. 10 to 14 together.

The storage device 1200 may include a storage controller 1210 and a non-volatile memory device 1220. The non-volatile memory device 1220 may store data. The storage controller 1210 may store data in the non-volatile memory device 1220 or may read data stored in the non-volatile memory device 1220. The non-volatile memory device 1220 may operate under control of the storage controller 1210.

For example, based on a command indicating an operation to be performed at the non-volatile memory device 1220 and an address indicating a location of data, the storage controller 1210 may store the data in the non-volatile memory device 1220 or may read the data stored in the non-volatile memory device 1220.

In some example embodiments, the non-volatile memory device 1220 may be a flash memory device, but the disclosure is not limited thereto. For example, the non-volatile memory device 1220 may be one of various storage devices, which retain data stored therein even if a power is turned off, such as a phase-change random access memory (PRAM), a magnetic RAM (MRAM), a resistive RAM (RRAM), and a ferroelectric RAM (FRAM).

The storage controller 1210 may include a command executor 1211 and a secure manager 1212. The command executor 1211 may execute a command generated by the command generator 1110. The secure manager 1212 may manage a secure mode of a command to be executed with respect to the non-volatile memory device 1220, based on the command executed by the command executor 1211.

In some example embodiments, the command executor 1211 may support the secure command protect configuration block SCPCB. For example, the command executor 1211 may execute a secure command according to a secure request including the secure command protect configuration block SCPCB, which is implemented with the replay protect memory block (RPMB) message of the UFS standard.

Figure 2:
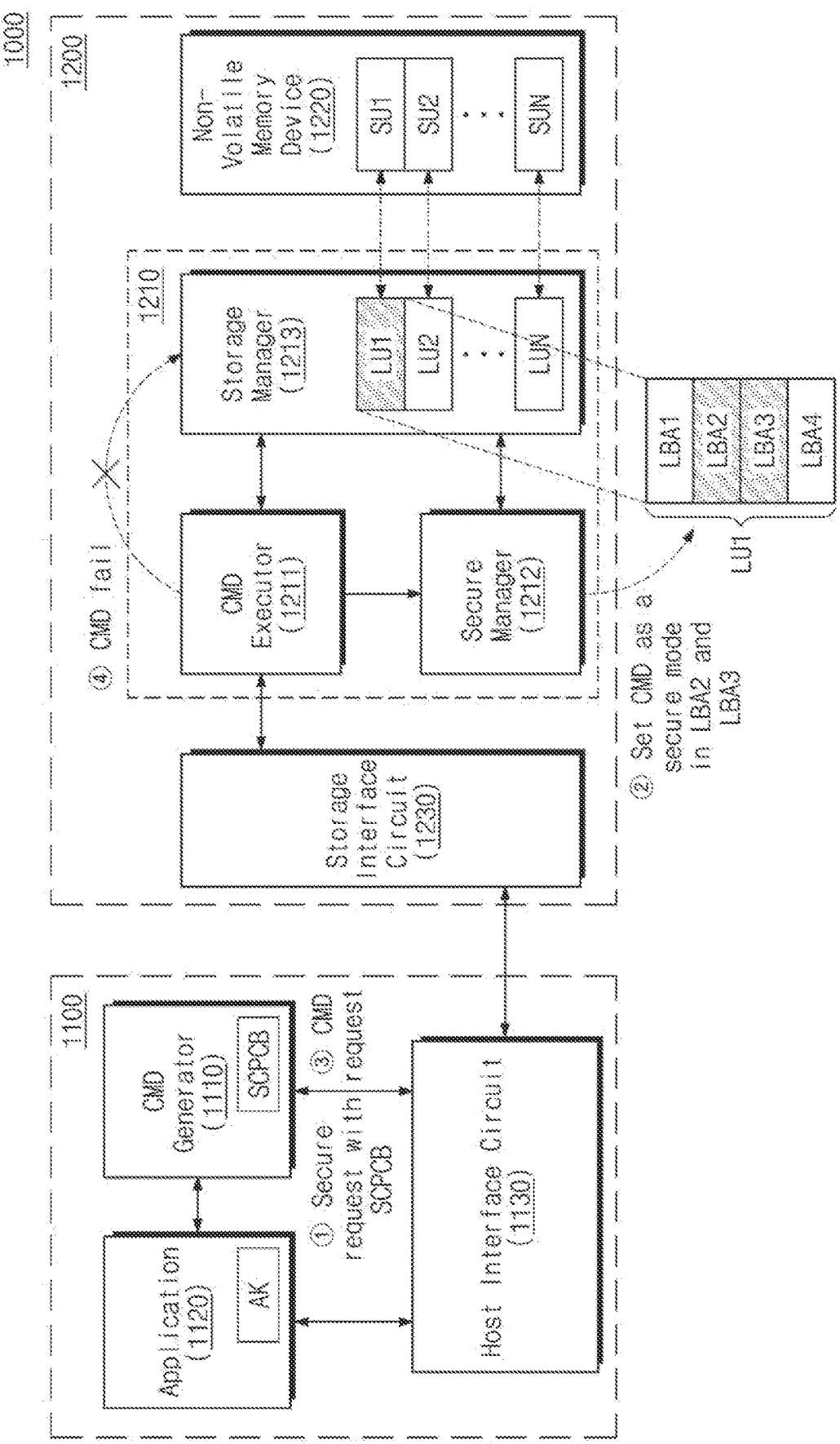
FIG. 2 is a diagram describing an operating method of a storage system of FIG. 1, according to some example embodiments of the disclosure.

FIG. 2 is a diagram describing an operating method of a storage system of FIG. 1, according to some example embodiments of the disclosure. Referring to FIG. 2, the storage system 1000 may include the host device 1100 and the storage device 1200.

The host device 1100 may include the command generator 1110, an application 1120, and a host interface circuit 1130. The command generator 1110 may generate a command indicating an operation to be performed at the storage device 1200. The command generator 1110 may support the secure command protect configuration block SCPCB.

The application 1120 may refer to application programs executable on the host device 1100. The application 1120 may include an authentication key AK. The authentication key AK may be used in an authentication operation of the RPMB.

The host device 1100 may communicate with the storage device 1200 through the host interface circuit 1130. For example, the host interface circuit 1130 may provide the storage device 1200 with a command and data, which are respectively provided from the command generator 1110 and the application 1120, or may provide the application 1120 with data received from the storage device 1200.

The storage device 1200 may include the storage controller 1210, the non-volatile memory device 1220, and a storage interface circuit 1230. The storage device 1200 may communicate with the host device 1100 through the storage interface circuit 1230. For example, the storage interface circuit 1230 may provide the storage controller 1210 with a command and data provided from the host device 1100 or may provide the host device 1100 with data received from the storage controller 1210. In some example embodiments, the host interface circuit 1130 and the storage interface circuit 1230 may communicate with each other in compliance with the UFS standard.

The storage controller 1210 may communicate with the storage interface circuit 1230. The storage controller 1210 may control the non-volatile memory device 1220. The storage controller 1210 may include the command executor 1211, the secure manager 1212, and a storage manager 1213.

The command executor 1211 may execute a command received from the host device 1100 through the storage interface circuit 1230. The secure manager 1212 may set a secure mode depending on a secure command executed by the command executor 1211. For example, depending on the secure command executed by the command executor 1211, the secure manager 1212 may set a secure mode of a command in second and third logical block addresses LBA2 and LBA3 of a first logical unit LU1 of a plurality of logical units LU1 to LUN of the storage manager 1213.

The storage manager 1213 may manage the plurality of logical units LU1, LU2, . . . LUN. Herein, "N" may be any natural number. Each of the plurality of logical units LU1 to LUN may include a plurality of logical block addresses. For brevity of drawing, an example in which the first logical unit LU1 includes first to fourth logical block addresses LBA1, LBA2, LBA3, and LBA4 is illustrated, but the disclosure is not limited thereto. The number of logical block addresses included in each of the plurality of logical units LU1 to LUN may increase or decrease.

The plurality of logical units LU1 to LUN that are managed by the storage manager 1213 may correspond to a plurality of storage units SU1, SU2, . . . SUN included in the non-volatile memory device 1220, respectively. For example, a logical address of a logical unit may have a logical-to-physical mapping relationship with a physical address of a storage unit.

In some example embodiments, the storage manager 1213 may manage the plurality of logical units LU1 to LUN in units of memory type. An attribute called a memory type may be a vendor specific attribute. For example, the first and second logical units LU1 and LU2 may be included in a first memory type, and may be implemented with single level cells (SLC) advantageous to the execution of the purge command. For example, the third and fourth logical units LU3 and LU4 may be included in a second memory type, and may be implemented with multi-level cells (MLC) or triple level cells (TLC) advantageous to store a large amount of data. However, the disclosure is not limited thereto. For example, a criterion for defining a memory type may be variously determined by the user or the vendor.

The non-volatile memory device 1220 may include a plurality of storage units SU1 to SUN. Under control of the storage manager 1213, each of the plurality of storage units SU1 to SUN may store data or may output data stored therein to the storage interface circuit 1230.

According to some example embodiments of the disclosure, the storage system 1000 may set the secure mode by using a secure request. The execution of a command in which the secure mode is set may be blocked.

In more detail, the command generator 1110 may generate the secure request including the secure command protect configuration block SCPCB. The secure request generated by the command generator 1110 may be provided to the storage device 1200 through the host interface circuit 1130.

The command executor 1211 may receive the secure request from the host device 1100 through the storage interface circuit 1230. The command executor 1211 may execute the secure command according to the secure request. As the secure command is executed by the command executor 1211, the secure manager 1212 may set (e.g., enable) the secure mode of a command, in the second logical block address LBA2 and the third logical block address LBA3 of the first logical unit LU1 managed by the storage manager 1213. The execution of a command in which the secure mode is set may be blocked. In some example embodiments, the setting of the secure mode may be performed by an authenticated user, based on the authentication key AK of the application 1120.

The command generator 1110 may request the execution of the command, in which the secure mode is set, at the second logical block address LBA2 and/or the third logical block address LBA3 of the first logical unit LU1. The command generator 1110 may provide the request to the storage device 1200 through the host interface circuit 1130.

The command executor 1211 may attempt to execute the command in which the secure mode is set, based on the request received through the storage interface circuit 1230. The command executor 1211 may fail in the execution of the command. The command executor 1211 may generate a response indicating the execution fail of the command. The command executor 1211 may output the response indicating the execution fail of the command to the host device 1100 through the storage interface circuit 1230.

Figure 3:
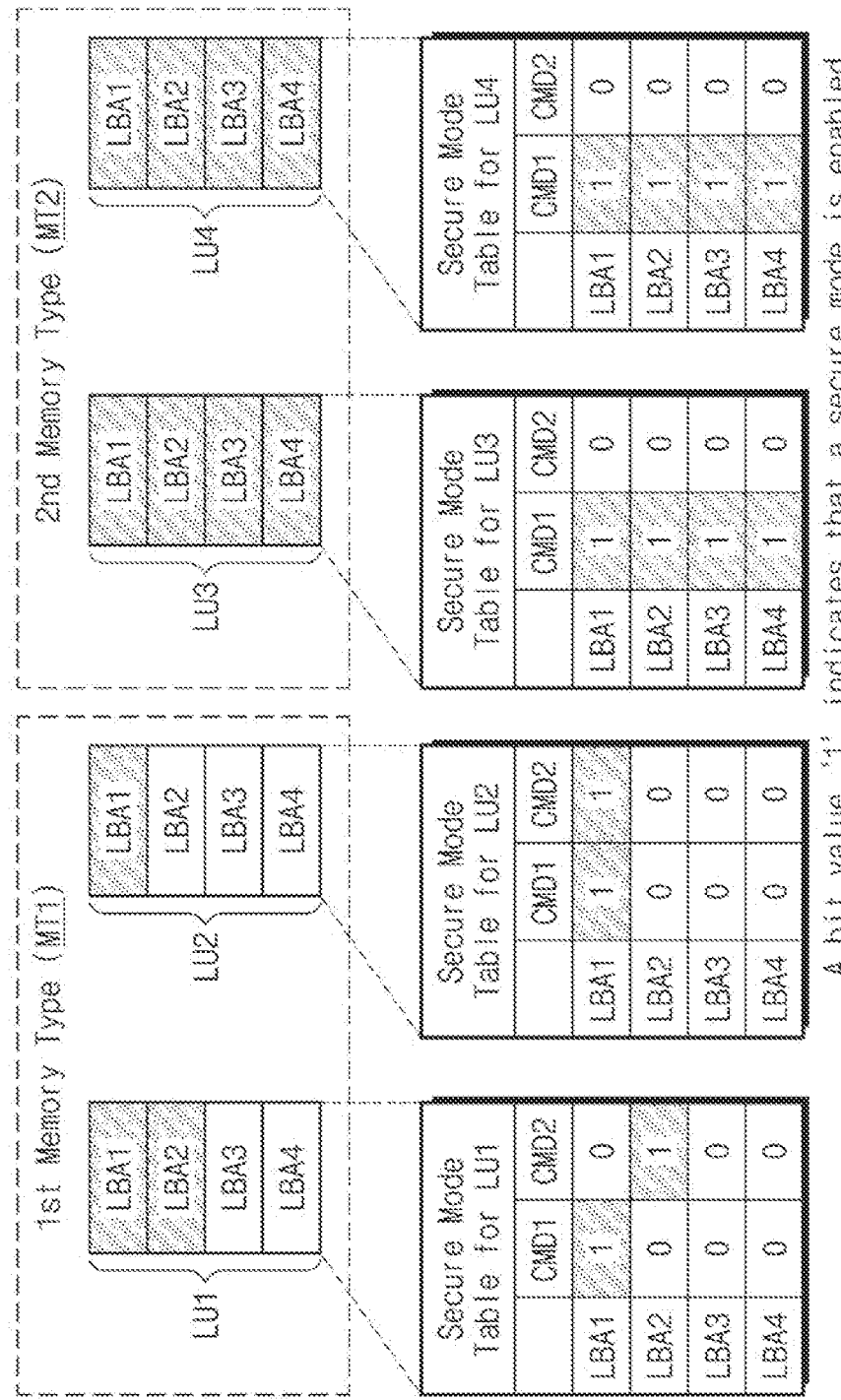
FIG. 3 is a diagram describing a secure environment of memory regions managed by a storage manager of FIG. 2, according to some example embodiments of the disclosure.

FIG. 3 is a diagram describing a secure environment of memory regions managed by a storage manager of FIG. 2, according to some example embodiments of the disclosure. Referring to FIGS. 2 and 3, the secure manager 1212 may set a secure environment of memory regions managed by the storage manager 1213, depending on the secure request from the host device 1100.

The secure environment may refer to secure modes in multiple memory regions. A range of a memory region in which the secure mode is set may be set by various units. For example, a unit of a memory region in which the secure mode is set may be a unit of a memory type, a unit of a logical unit, or a unit of a logical block address.

In some example embodiments, the storage manager 1213 may manage the memory regions in units of memory type. For example, the storage manager 1213 may manage the memory regions based on a first memory type MT1 and a second memory type MT2. The first memory type MT1 may include the first logical unit LU1 and the second logical unit LU2. The second memory type MT2 may include the third logical unit LU3 and the fourth logical unit LU4. Each of the first to fourth logical units LU1 to LU4 may include the first to fourth logical block addresses LBA1 to LBA4. However, the disclosure is not limited thereto. For example, the number of memory types, the number of logical units included in a memory type, and the number of logical block addresses included in each of different logical units may increase or decrease.

In some example embodiments, the secure manager 1212 may manage secure modes of a plurality of commands CMD1 and CMD2. For example, the command generator 1110 may generate the secure request indicating protection of the first command CMD1 in the first logical block address LBA1 of the first logical unit LU1 and protection of the second command CMD2 in the second logical block address LBA2 of the first logical unit LU1. The command executor 1211 may execute the secure request. For example, depending on the secure command executed by the command executor 1211, the secure manager 1212 may enable the secure mode of the first command CMD1 in the first logical block address LBA1 of the first logical unit LU1 and may enable the secure mode the second command CMD2 in the second logical block address LBA2 of the first logical unit LU1. However, the disclosure is not limited thereto. For example, the secure manager 1212 may further manage secure modes of any other commands in addition to the first and second commands CMD1 and CMD2.

In some example embodiments, the secure manager 1212 may manage a secure mode table corresponding to a logical unit. For example, the secure mode table of the first logical unit LU1 may store information about whether to protect the first and second commands CMD1 and CMD2 associated with each of the first to fourth logical block addresses LBA1 to LBA4. For example, when a code value corresponding to the first logical block address LBA1 and the first command CMD1 of the first logical unit LU1 is a first code value (e.g., "1b"), the execution of the first command CMD1 in the first logical block address LBA1 of the first logical unit LU1 may be blocked. For example, when a code value corresponding to the first logical block address LBA1 and the second command CMD2 of the first logical unit LU1 is a second code value (e.g., "0b"), the execution of the second command CMD2 in the first logical block address LBA1 of the first logical unit LU1 may not be blocked. As in the above description, in the second logical block address LBA2 of the first logical unit LU1, the execution of the first command CMD1 may not be blocked, and the execution the second command CMD2 may be blocked.

In some example embodiments, the secure manager 1212 may manage the secure mode in units of logical block address. For example, referring to the secure mode table of the second logical unit LU2, the execution of the first and second commands CMD1 and CMD2 in the first logical block address LBA1 of the second logical unit LU2 may be blocked. The execution of the first and second commands CMD1 and CMD2 in the second to fourth logical block addresses LBA2 to LBA4 of the second logical unit LU2 may not be blocked. The setting of secure modes of different logical block addresses included in the same logical unit may be performed based on one secure request.

In some example embodiments, the secure manager 1212 may manage the secure mode in units of logical unit. For example, referring to the secure mode table of the third logical unit LU3, the execution of the first command CMD1 in the first to fourth logical block addresses LBA1 to LBA4 of the third logical unit LU3 may be blocked, and the execution of the second command CMD2 in the first to fourth logical block addresses LBA1 to LBA4 of the third logical unit LU3 may not be blocked. The simultaneous setting of secure modes of all logical block addresses included in the same logical unit may be performed based on one secure request.

In some example embodiments, the secure manager 1212 may manage the secure mode in units of memory type. For example, the second memory type MT2 may include the third logical unit LU3 and the fourth logical unit LU4. Referring to the secure mode table of the third logical unit LU3, the execution of the first command CMD1 in the third logical unit LU3 may be blocked, and the execution of the second command CMD2 in the third logical unit LU3 may not be blocked. Referring to the secure mode table of the fourth logical unit LU4, the execution of the first command CMD1 in the fourth logical unit LU4 may be blocked, and the execution of the second command CMD2 in the fourth logical unit LU4 may not be blocked. The simultaneous setting of secure modes of all logical units included in the same memory type may be performed based on one secure request.

As described above, according to embodiments of the disclosure, a storage device that sets a secure mode in units of logical block address, in units of logical unit, and/or in the units of memory type may be provided, and a storage device that sets different secure modes to a plurality of commands may be provided. As such, a storage device that provides a flexible secure environment with regard to various ranges of memory regions and various kinds of commands may be provided.

Figure 4:
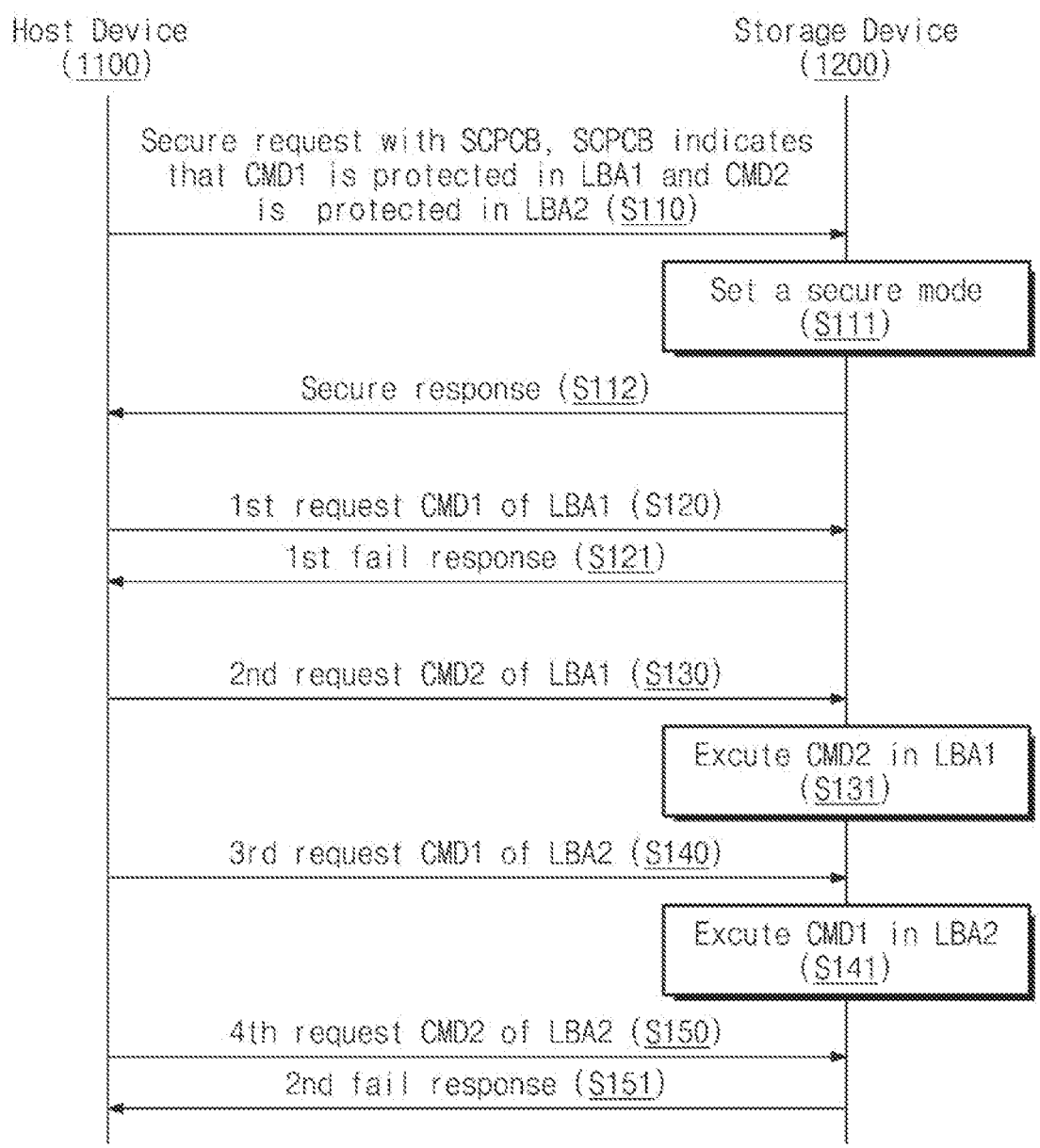
FIG. 4 is a flowchart describing an operating method of a storage system, according to some example embodiments of the disclosure.

FIG. 4 is a flowchart describing an operating method of a storage system, according to some example embodiments of the disclosure. An operating method of a storage system including the host device 1100 and the storage device 1200 will be described with reference to in FIG. 4. The storage system may correspond to the storage system 1000 of FIG. 1 and the storage system 1000 of FIG. 2.

In operation S110, the host device 1100 may output the secure request having the secure command protect configuration block SCPCB to the storage device 1200. The secure command protect configuration block SCPCB may indicate protection of the first command CMD1 in the first logical block address LBA1 and protection of the second command CMD2 in the second logical block address LBA2.

In operation S111, the storage device 1200 may set the secure mode based on the secure request in operation S110. For example, the storage device 1200 may enable the secure mode of the first command CMD1 associated with the first logical block address LBA1 and may disable the secure mode of the second command CMD2 associated with the first logical block address LBA1. The storage device 1200 may disable the secure mode of the first command CMD1 associated with the second logical block address LBA2 and may enable the secure mode of the second command CMD2 associated with the second logical block address LBA2.

In operation S112, the storage device 1200 may output, to the host device 1100, a secure response indicating that the setting of the secure modes is completed.

In operation S120, the host device 1100 may output a first request, which corresponds to a request for the execution of the first command CMD1 in the first logical block address LBA1, to the storage device 1200. In operation S121, the storage device 1200 may output a first fail response, which indicates a fail of the first command CMD1 in the first logical block address LBA1, to the host device 1100 based on the first request in operation S120.

In operation S130, the host device 1100 may output a second request, which corresponds to a request for the execution of the second command CMD2 in the first logical block address LBA1, to the storage device 1200. In operation S131, the storage device 1200 may execute the second command CMD2 in the first logical block address LBA1, based on the second request in operation S130.

In operation S140, the host device 1100 may output a third request, which corresponds to a request for the execution of the first command CMD1 in the second logical block address LBA2, to the storage device 1200. In operation S141, the storage device 1200 may execute the first command CMD1 in the second logical block address LBA2, based on the third request in operation S140.

In operation S150, the host device 1100 may output a fourth request, which corresponds to a request for the execution of the second command CMD2 in the second logical block address LBA2, to the storage device 1200. In operation S151, the storage device 1200 may output a second fail response, which indicates a fail of the second command CMD2 in the second logical block address LBA2, to the host device 1100 based on the fourth request in operation S150.

Figure 5:
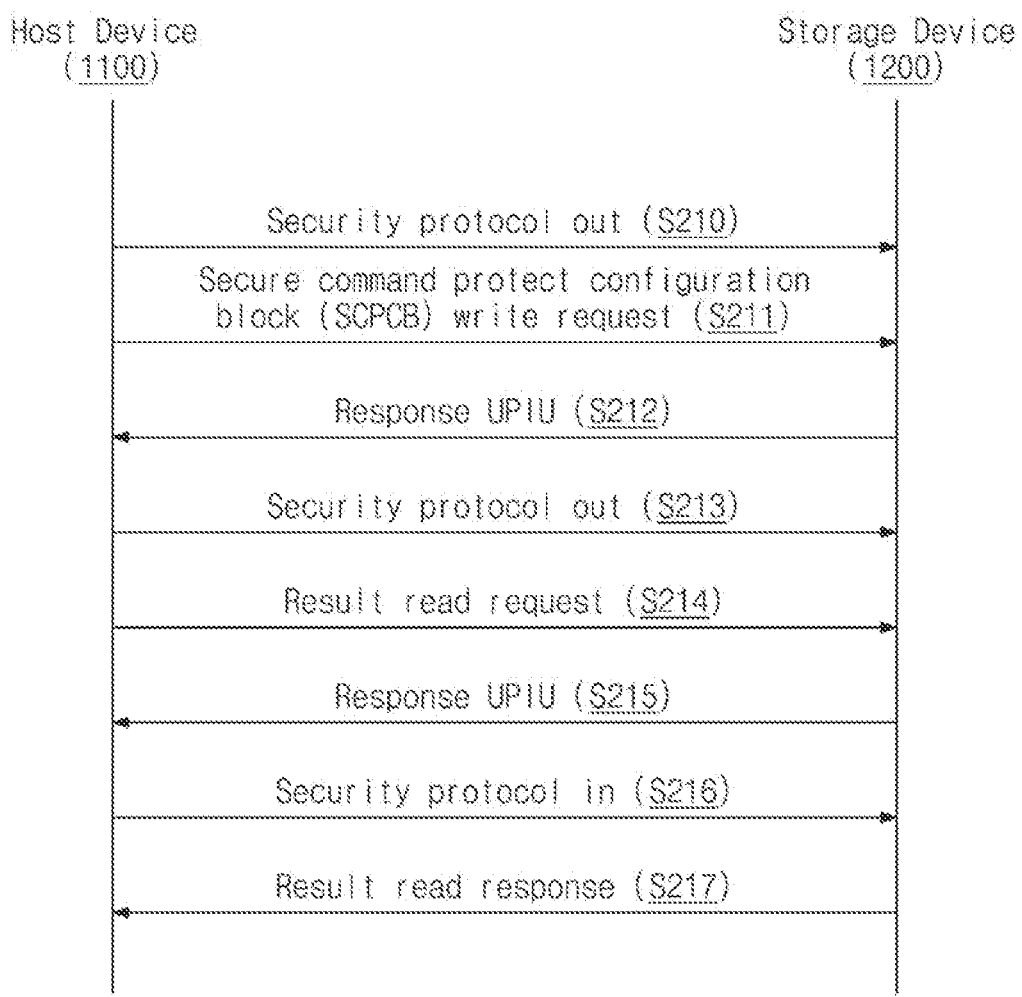
FIG. 5 is a flowchart describing an operating method of a storage system, according to some example embodiments of the disclosure.

FIG. 5 is a flowchart describing an operating method of a storage system, according to some example embodiments of the disclosure. An operating method of a storage system including the host device 1100 and the storage device 1200 will be described with reference to FIG. 5. The storage system may support the RPMB message of the UFS standard. The operating method of FIG. 5 may correspond to some operations S110, S111, and S112 of FIG. 4.

In operation S210, the host device 1100 may transmit a security protocol out command to the storage device 1200. The security protocol out command may be implemented with the RPMB message of the UFS standard. The security protocol out command in operation S210 may be a command for starting a secure command protect configuration block (SCPCB) write request.

In operation S211, the host device 1100 may output the secure command protect configuration block (SCPCB) write request to the storage device 1200. The secure command protect configuration block (SCPCB) write request may be a signal that allows the storage device 1200 to set a secure mode of a command. The secure command protect configuration block (SCPCB) write request may correspond to the secure request of FIGS. 1 and 2 or the secure request according to operation S110 of FIG. 4.

For example, the secure command protect configuration block (SCPCB) write request may include the secure command protect configuration block (SCPCB) indicating a secure mode of a command, a message authentication code (MAC), a current write counter value, an address, etc.

In some example embodiments, operation S211 may include transmitting, at the host device 1100, a command UFS protocol information unit (UPIU) for the secure command protect configuration block (SCPCB) write request to the storage device 1200, transmitting, at the storage device 1200, a ready-to-transfer UPIU to the host device 1100, and transmitting, at the host device 1100, a data output UPIU to the storage device 1200.

In operation S212, the storage device 1200 may transmit a response UPIU corresponding to the secure command protect configuration block (SCPCB) write request in operation S211 to the host device 1100.

In operation S213, the host device 1100 may transmit the security protocol out command to the storage device 1200. The security protocol out command in operation S213 may be a command for starting a result read request.

In operation S214, the host device 1100 may transmit the result read request to the storage device 1200. The result read request may be a request for verifying whether the secure mode of the command is set according to operation S211.

In some example embodiments, operation S214 may include transmitting, at the host device 1100, a command UPIU for the result read request to the storage device 1200, transmitting, at the storage device 1200, a ready-to-transfer UPIU to the host device 1100, and transmitting, at the host device 1100, a data output UPIU to the storage device 1200.

In operation S215, the storage device 1200 may transmit a response UPIU corresponding to the result read request in operation S214 to the host device 1100.

In operation S216, the host device 1100 may transmit a security protocol in command to the storage device 1200. The security protocol in command in operation S216 may be a command for starting a result read response.

In operation S217, the storage device 1200 may transmit the result read response to the host device 1100. The result read response may include a result code according to the result read request in operation S214.

In some example embodiments, operation S217 may include transmitting, at the host device 1100, a command UPIU for the result read response to the storage device 1200, transmitting, at the storage device 1200, a data in UPIU to the host device 1100, and transmitting, at the storage device 1200, a response UPIU to the host device 1100.

FIG. 6 is a diagram for describing a relay protect memory block (RPMB) message, according to some example embodiments of the disclosure. An RPMB message configuration will be described with reference to FIG. 6. The RPMB message may support the secure request described with reference to FIGS. 1, 2, 4, and 5.

The RPMB message configuration may include fields for a request message type, a response message type, an authentication key, an MAC, a result, a write counter, an address, a nonce, data, and a block count.

The request message type may be included in a field for defining a request message type. The request message type may have a length of 2 bytes. The response message type may be included in a field for defining a response message type. The response message type may have a length of 2 bytes. In some example embodiments, the request message type and the response message type may support the secure command protect configuration block SCPCB.

The data may be included in a field supporting data to be written or read. The data may have a length of 256 bytes. In some example embodiments, the data field of the RPMB message may include the secure command protect configuration block SCPCB.

The authentication key may be included in a field used to program an authentication key. The authentication key may have a length of 32 bytes. The MAC may be included in a field describing a message authentication code. The MAC may have a length of 32 bytes. The result may be included in a field describing an operation result (e.g., a success or a fail) according to the RPMB message. The result may have a length of 2 bytes. The write counter may be included in a field describing the total amount of successful authenticated data write operations. The write counter may have a length of 4 bytes. The address may be included in a field indicating a logical block address (LBA) of data to be programmed in an RPMB region or to be read from the RPMB region. The address may have a length of 2 bytes. The nonce may be included in a field indicating a random number (e.g., a temporary value) generated by a host (e.g., a host device). The nonce may have a length of 16 bytes. The block count may indicate the number of 256-byte logical blocks requested to be programmed or to be read. The block count may have a length of 2 bytes.

FIG. 7A is a diagram illustrating a request message type of FIG. 6 in detail, according to some example embodiments of the disclosure. Request message types according to the RPMB message configuration of FIG. 6 will be described with reference to FIG. 7A.

In request message types, code "0001h" may indicate an authentication key programming request. Code "0002h" may indicate a write counter read request. Code "0003h" may indicate an authenticated data write request. Code "0004h" may indicate an authenticated data read request. Code "0005h" may indicate a result read request. Code "0006h" may indicate a secure write protect configuration block write request. Code "0007h" may indicate a secure write protect configuration block read request.

Code "0008h" may indicate a secure command protect configuration block write request. The secure command protect configuration block write request may correspond to the authentication request described with reference to of FIGS. 1, 2, 4, and 5. The secure command protect configuration block write request may be a type defined to support the secure command protect configuration block SCPCB. For example, the secure command protect configuration block write request may be a request for setting a secure mode of a command of a storage device.

Code "0009h" may indicate a secure command protect configuration block read request. The secure command protect configuration block read request may be a type defined to support the secure command protect configuration block SCPCB.

FIG. 7B is a diagram illustrating a response message type of FIG. 6 in detail, according to some example embodiments of the disclosure. Response message types according to the RPMB message configuration of FIG. 6 will be described with reference to FIG. 7B.

In response message types, code "0100h" may indicate an authentication key programming response. Code "0200h" may indicate a write counter read response. Code "0300h" may indicate an authenticated data write response. Code "0400h" may indicate an authenticated data read response. Code "0500h" may indicate "reserved". For example, the result read request corresponding to code "0005h" from among the request message types of FIG. 7A may be a request message not requiring a response, and a response message type corresponding to code "0500 W" may not be used. Code "0600h" may indicate a secure write protect configuration block write response. Code "0700h" may indicate a secure write protect configuration block read response.

Code "0800h" may indicate a secure command protect configuration block write response. The secure command protect configuration block write response may be a response signal corresponding to the secure command protect configuration block write request of code "0008h" of FIG. 7A. The secure command protect configuration block write response may be a type defined to support the secure command protect configuration block SCPCB.

Code "0900h" may indicate a secure command protect configuration block read response. The secure command protect configuration block read response may be a response signal corresponding to the secure command protect configuration block read request of code "0009h" of FIG. 7A. The secure command protect configuration block read response may be a type defined to support the secure command protect configuration block SCPCB.

Figure 8:
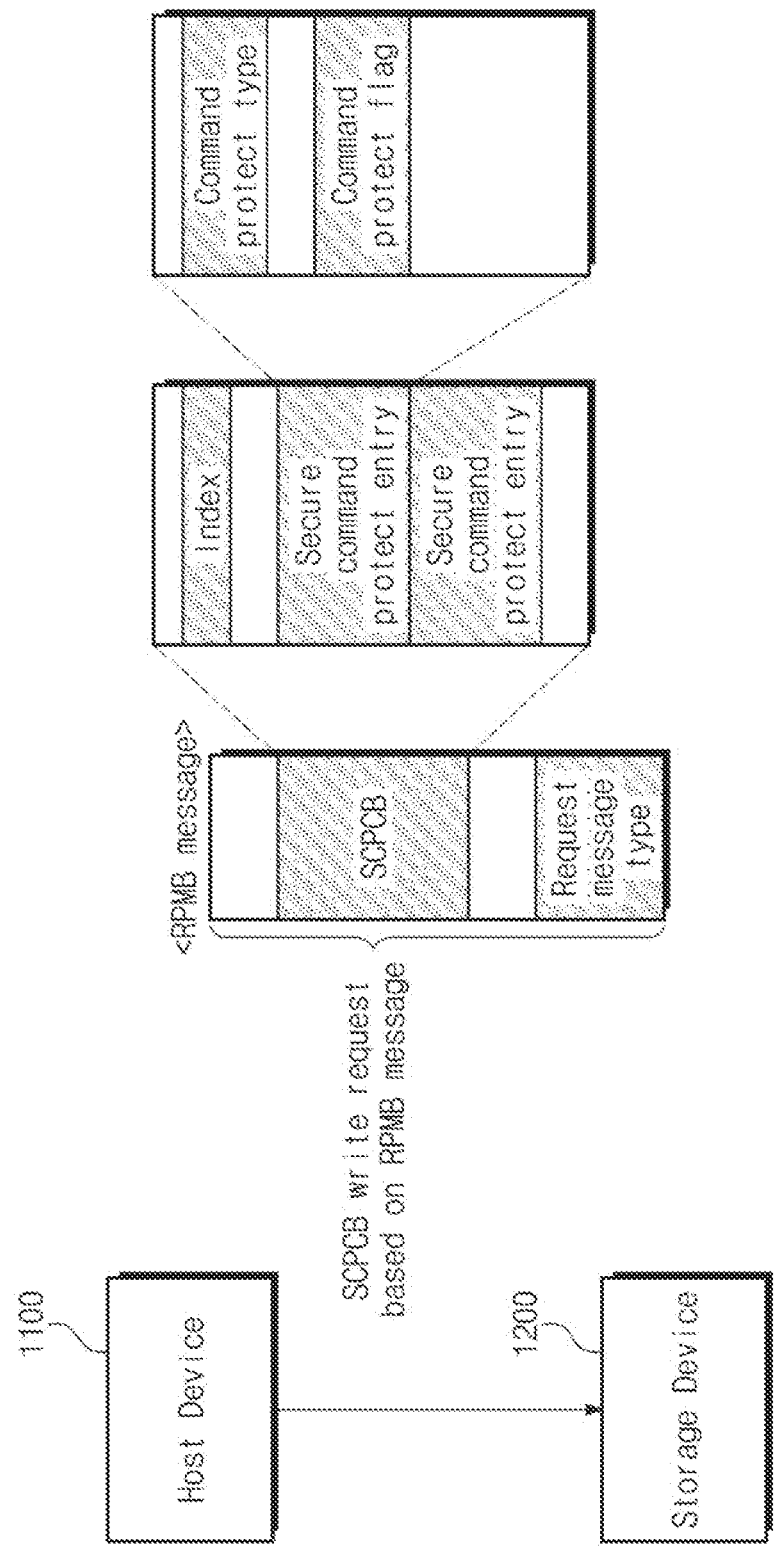
FIG. 8 is a diagram describing a secure command protect configuration block write request, according to some example embodiments of the disclosure.

FIG. 8 is a diagram describing a secure command protect configuration block write request, according to some example embodiments of the disclosure. Referring to FIG. 8, the host device 1100 may send the secure command protect configuration block (SCPCB) write request, which is based on the RPMB message, to the storage device 1200. The secure command protect configuration block (SCPCB) write request may make it possible to flexibly set the secure mode with respect to various ranges of memory regions and various kinds of commands at the storage device 1200.

The secure command protect configuration block (SCPCB) write request may be implemented with the RPMB message. For example, the secure command protect configuration block (SCPCB) write request may be a request message of the RPMB message supporting the secure command protect configuration block SCPCB described with reference to FIG. 6.

The secure command protect configuration block (SCPCB) write request may include the secure command protect configuration block SCPCB and a request message type. The request message type may indicate a request message type of the RPMB message. The secure command protect configuration block SCPCB may include pieces of information for setting a secure mode, for example, a range of memory regions in which the secure mode is to be set and/or commands in which the secure mode is to be set.

The secure command protect configuration block SCPCB may include an index and at least one secure command protect entry. The index may indicate a range of memory regions in which the secure mode is to be set. For example, the index may indicate whether a range of memory regions in which the secure mode is to be set is a unit corresponding to a logical block address, a logical unit, or a memory type. The index may include an index for identifying a logical block address, an index for identifying a logical unit, or an index for identifying a memory type.

The at least one secure command protect entry may indicate information of a secure mode for each of a plurality of commands and information of an address of the corresponding memory region. The at least one secure command protect entry may include a command protect type and a command protect flag.

The command protect flag may include code values indicating whether to enable or disable a secure mode of each of the plurality of commands. The command protect type may define a type for controlling the command protect flag.

For example, the command protect type may define types for setting code values of the command protect flag after a power cycle or hardware reset. The power cycle may mean that a power supplied to a storage device is turned off and is then again supplied to the storage device. The hardware reset may mean that a power supplied to a storage device is maintained but the storage device is again set to default settings.

FIG. 9 is a diagram illustrating a secure command protect configuration block write request of FIG. 8 in detail, according to some example embodiments of the disclosure. The secure command protect configuration block (SCPCB) write request of FIG. 8 will be described with reference to FIG. 9. The secure command protect configuration block (SCPCB) write request may be implemented with the RPMB message.

The RPMB message for the secure command protect configuration block (SCPCB) write request may have a size of 512 bytes. An offset may indicate a byte from which the corresponding field starts and a byte at which the corresponding field ends. A field name may indicate a field name according to the RPMB message configuration (refer to FIG. 6). A value may indicate a value included in the corresponding field name.

In offset "0:195", a message (i.e., the RPMB message for the secure command protect configuration block (SCPCB) write request) may be filled with stuff bytes having a random value. In offset "196:227", a message may include a message authentication code (MAC) received from a host device.

In offset "228:483", a message may include the secure command protect configuration block SCPCB. The secure command protect configuration block SCPCB may include information of a secure mode of a command. The secure command protect configuration block SCPCB may have a size of 256 bytes.

In offset "484:499", a message may have a value corresponding to a nonce. In offset "500:503", a message may have a current counter value corresponding to a write counter. In offset "504:505", a message may have a value corresponding to an address. In offset "506:507", a message may have a value corresponding to a block count. In offset "508:509", a message may have a value corresponding to a result.

In offset "510:511", a message may have a value corresponding to a request message type. For example, as described with reference to FIG. 7A, because the secure command protect configuration block write request may correspond to "0008h", a value indicating a request message type of offset "510:511" may be "0008h".

FIG. 10 is a diagram illustrating a secure command protect configuration block of FIG. 9 in detail, according to some example embodiments of the disclosure. The secure command protect configuration block SCPCB included in offset "228:483" of FIG. 9 will be described with reference to FIG. 10. The secure command protect configuration block SCPCB may have a size of 256 bytes (i.e., 256*8 bits).

In byte "0", the secure command protect configuration block SCPCB may include an index. In byte "1", the secure command protect configuration block SCPCB may include a data length.

In a range from byte "2" to byte "21", the secure command protect configuration block SCPCB may include a first secure command protect entry. That is, the secure command protect entry may have a size of 20 bytes. As in the above description, the secure command protect configuration block SCPCB may include a second secure command protect entry from byte "22" to byte "41", may include a third secure command protect entry from byte "42" to byte "61", and may include a fourth secure command protect entry from byte "62" to byte "81".

A range from byte "82" to byte "255" may not be used. For example, the range from byte "82" to byte "255" may be a reserved region. However, the disclosure is not limited thereto. The number of secure command protect entries that the secure command protect configuration block SCPCB manages may increase or decrease depending on the number of logical block addresses included in one logical unit.

FIG. 11 is a diagram illustrating an index of FIG. 10 in detail, according to some example embodiments of the disclosure. An index of the secure command protect configuration block SCPCB of FIG. 10 will be described with reference to FIG. 11. The index may be included in byte "0" of the secure command protect configuration block SCPCB. The size of the index may be 1 byte (i.e., 8 bits).

In a range from bit "0" to bit "5", the index may include a value for identifying a logical unit or a memory type MT. In a range from bit "6" to bit "7", the index may include a code value defining a range of a memory region in which the secure mode is to be set.

When bit "6" and bit "7" of the index constitute code "00b", the secure command protect configuration block SCPCB may direct a protection operation to be performed in units of logical block address (i.e., an enabling of the secure mode to be set in units of logical block address). Bit "0" to bit "5" of the index may include a value for identifying a logical unit including a logical block address in which the secure mode is to be set.

In some example embodiments, one logical unit may include first to fourth logical block addresses. A storage device may differently set secure modes of the first to fourth logical block addresses through first to fourth secure command protect entries respectively corresponding to the first to fourth logical block addresses.

When bit "6" and bit "7" of the index constitute code "01b", the secure command protect configuration block SCPCB may direct a protection operation to be performed in units of logical unit. Bit "0" to bit "5" of the index may include a value for identifying a logical unit in which the secure mode is to be set. In this case, the same secure mode may be set to all logical block addresses included in the corresponding logical unit. For example, in FIG. 10, only the first secure command protect entry may be used, and the second to fourth secure command protect entries may not be used.

When bit "6" and bit "7" of the index constitute code "10b", the secure command protect configuration block SCPCB may direct a protection operation to be performed in units of memory type MT. Bit "0" to bit "5" of the index may include a value for identifying a memory type MT in which the secure mode is to be set. In this case, the same secure mode may be set to all logical block addresses of all logical units included in the corresponding memory type MT. For example, in FIG. 10, only the first secure command protect entry may be used, and the second to fourth secure command protect entries may not be used.

When bit "6" and bit "7" of the index constitute code "11b", the secure command protect configuration block SCPCB may direct that a protection operation is not performed.

FIG. 12 is a diagram illustrating a secure command protect entry of FIG. 10 in detail, according to some example embodiments of the disclosure. A secure command protect entry of the secure command protect configuration block SCPCB of FIG. 10 will be described with reference to FIG.

12. The secure command protect entry to be described with reference to FIG. 12 may correspond to one of the first to fourth secure command protect entries of FIG. 10. The size of the secure command protect entry may be 20 bytes (i.e., 160 bits).

From bit "0" to bit "1" of byte "0", the secure command protect entry may include a command protect type CPT. The command protect type CPT may define a type for controlling the command protect flag CPF. From bit "2" to bit "7" of byte "0", the secure command protect entry may include a reserved value.

From byte "1" to byte "7", the secure command protect entry may include a command protect flag CPF. The command protect flag CPF may indicate whether to enable secure modes of a plurality of commands, in a logical block address, a logical unit, or a memory type corresponding to the secure command protect entry.

From byte "8" to byte "15", the secure command protect entry may include a logical block address in which the secure mode is to be set. From byte "16" to byte "19", the secure command protect entry may include information about the number of logical blocks in which the secure mode is to be set.

FIG. 13 is a diagram illustrating a command protect type of FIG. 12 in detail, according to some example embodiments of the disclosure. The command protect type CPT included in the secure command protect entry will be described with reference to FIGS. 12 and 13. The command protect type CPT may control the command protect flag CPF. The size of the command protect type CPT may be 2 bits. The command protect type CPT may have a code value of 2 bits.

When the command protect type CPT has code "00b", existing code values of the command protect flag CPF of the secure command protect entry may be maintained even after the power cycle or the hardware reset. For example, the code values of the command protect flag CPF may be changed only by the secure command protect configuration block (SCPCB) write request.

When the command protect type CPT has code "01b", all code values of the command protect flag CPF of the secure command protect entry may be set to "0b" after the power cycle or the hardware reset. That a code value of the command protect flag CPF is "0b" may mean that secure modes of commands corresponding to the command protect flag CPF are disabled.

When the command protect type CPT has code "10b", all code values of the command protect flag CPF of the secure command protect entry may be set to "1b" after the power cycle or the hardware reset. That a code value of the command protect flag CPF is "1b" may mean that secure modes of commands corresponding to the command protect flag CPF are enabled.

When the command protect type CPT has code "11b", code values of the command protect flag CPF of the secure command protect entry may not be managed. For example, the RPMB message having the secure command protect entry may not manage a secure mode of a storage device.

FIG. 14 is a diagram illustrating a command protect flag of FIG. 12 in detail, according to some example embodiments of the disclosure. The command protect flag CPF included in the secure command protect entry will be described with reference to FIGS. 12 and 14. The command protect flag CPF may indicate whether to enable a secure mode of each of a plurality of commands. The size of the command protect flag CPF may be 56 bits. Each of the 56 bits of the command protect flag CPF may define whether to protect the corresponding command (i.e., whether to enable or disable a secure mode).

Bit "8" of the command protect flag CPF may indicate whether to protect a read command. When bit "8" has code "0b", the secure mode of the read command may be disabled. The command in which the secure mode is disabled may be executed depending on a request of a host device. When bit "8" has code "1b", the secure mode of the read command may be enabled. The command in which the secure mode is enabled may fail to be executed even if a request of the host device to execute the command is received.

Bit "9" of the command protect flag CPF may indicate whether to protect a write command. When bit "9" has code "0b", the secure mode of the write command may be disabled. When bit "9" has code "1b", the secure mode of the write command may be enabled.

Bit "10" of the command protect flag CPF may indicate whether to protect a purge command. When bit "10" has code "0b", the secure mode of the purge command may be disabled. When bit "10" has code "1b", the secure mode of the purge command may be enabled.

Bit "11" of the command protect flag CPF may indicate whether to protect an unmap command. When bit "11" has code "0b", the secure mode of the unmap command may be disabled. When bit "11" has code "1b", the secure mode of the unmap command may be enabled.

As in the above description, whether to protect any other commands may be defined by using bit "12" to bit "63" of the command protect flag CPF. For example, the command protect flag CPF may define whether to protect any other command by using bit "12", and in this manner, may define whether to protect a maximum of 56 commands. However, the disclosure is not limited thereto. When the number of commands is more than 56, it would be obvious to one skilled in the art that the disclosure belongs to increase the size of the command protect flag CPF by adjusting a reserved region of the secure command protect configuration block SCPCB.

In some example embodiments, because the command protect flag CPF exists every secure command protect entry, the storage device may set a secure mode of each of the commands in units of logical block address. However, the disclosure is not limited thereto. When the index of the secure command protect configuration block indicates that a secure mode is set in units of logical unit or in units of memory type, the storage device may set a secure mode of each of commands in units of logical unit or in units of memory type.

As described above, the command protect flag CPF may indicate whether to enable or disable a secure mode of each of a plurality of commands. For better understanding of the disclosure, the description is described with reference to FIG. 14 that bit "8" to bit "11" correspond to read, write, purge, and unmap commands, respectively. However, the disclosure is not limited thereto. For example, the order and/or types of commands in the command protect flag CPF may be variously changed.

Figure 15:
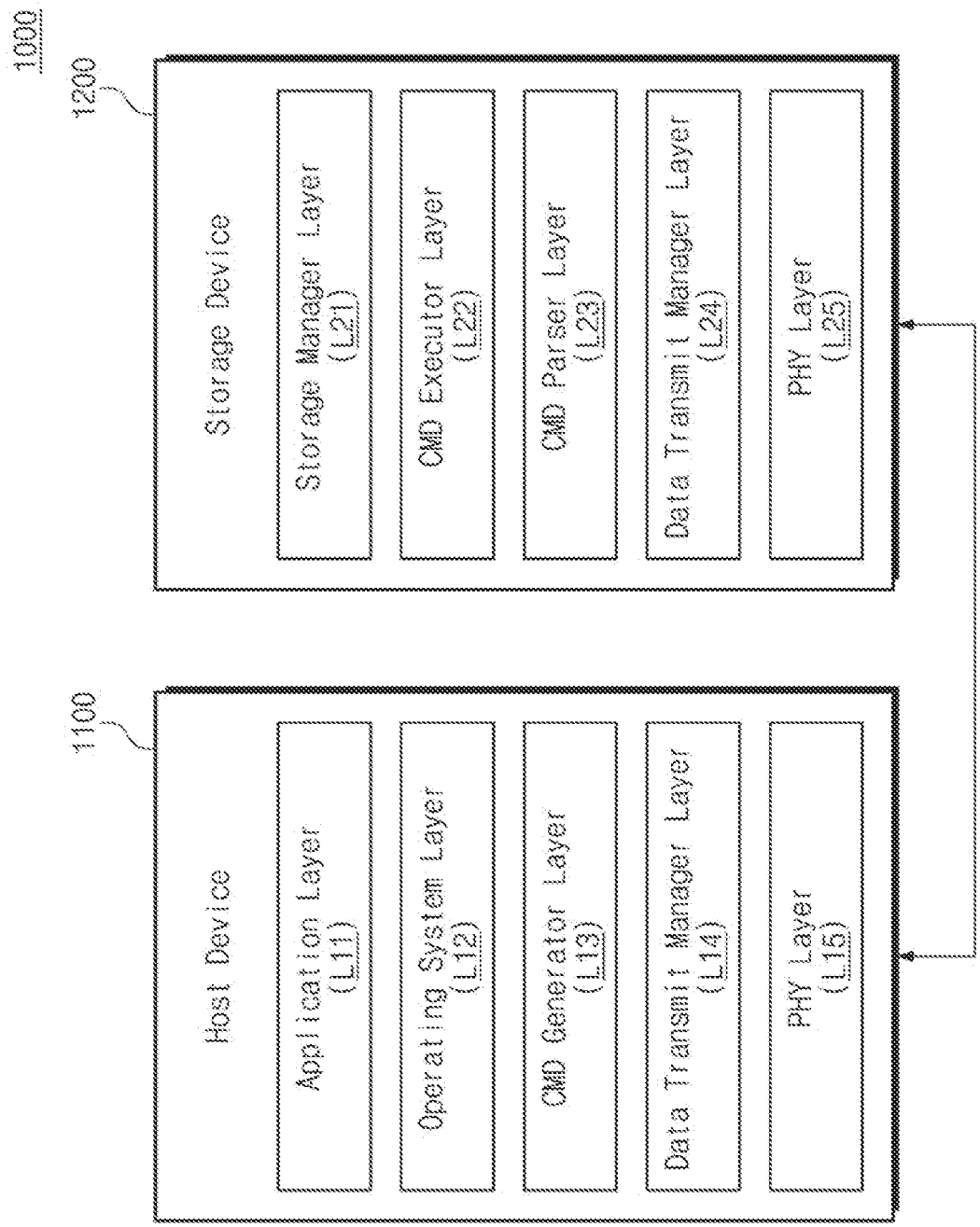
FIG. 15 is a block diagram describing a storage system, according to some example embodiments of the disclosure.

FIG. 15 is a block diagram describing a storage system, according to some example embodiments of the disclosure. The architecture of the storage system 1000 will be described with reference to FIG. 15. The storage system 1000 may correspond to the storage system 1000 described with reference to FIGS. 1 and 2, and may support the secure command protect configuration block (SCPCB) write request of FIG. 8. The storage system 1000 may include the host device 1100 and the storage device 1200.

The host device 1100 may include an application layer L11, an operating system layer L12, a command generator layer L13, a data transmit manager layer L14, and a physical (PHY) layer L15. The storage device 1200 may include a storage manager layer L21, a command executor layer L22, a command parser layer L23, a data transmit manager layer L24, and a PHY layer L25.

The application layer L11 may include application programs executable on the host device 1100. The operating system layer L12 may include a file system. The operating system layer L12 may provide an environment in which application programs of the application layer L11 are executed.

The command generator layer L13 may generate a command capable of being processed by the storage device 1200. The command generator layer L13 may generate the secure request including the secure command protect configuration block SCPCB.

The data transmit manager layer L14 may generate a packet based on a command received from the command generator layer L13 and data received from the application layer L11.

The PHY layer L15 may transmit an electrical signal to the PHY layer L25 or may receive an electrical signal from the PHY layer L25. For example, the PHY layer L15 may receive a packet from the data transmit manager layer L14 and may physically (e.g., electrically) transmit the received packet to the PHY layer L25 of the storage device 1200. The PHY layer L15 may transmit a packet received from the PHY layer L25 to the data transmit manager layer L14.

The PHY layer L25 may transmit an electrical signal to the PHY layer L15 or may receive an electrical signal from the PHY layer L15. The PHY layer L25 may transmit a packet received from the PHY layer L15 to the data transmit manager layer L24. Alternatively, the PHY layer L25 may transmit a packet received from the data transmit manager layer L24 to the PHY layer L15.

The data transmit manager layer L24 may manage a packet. The data transmit manager layer L24 may transmit a command (e.g., a secure request, a read request, or a write request), which is included in a packet received through the PHY layer L25, to the command parser layer L23. The data transmit manager layer L24 may transmit data, which are included in the packet received through the PHY layer L25, to the storage manager layer L21.

The command parser layer L23 may parse the command received from the data transmit manager layer L24. The command parser layer L23 may parse the secure request including the secure command protect configuration block SCPCB. The command parser layer L23 may transmit the parsed command to the command executor layer L22.

The command executor layer L22 may parse the command received from the command parser layer L23. The command executor layer L22 may set secure modes of memory regions managed by the storage manager layer L21, based on the secure command protect configuration block SCPCB of the secure request parsed by the command parser layer L23. The storage manager layer L21 may manage memory regions (e.g., a logical block address LBA and a logical unit LU).

Figure 16:
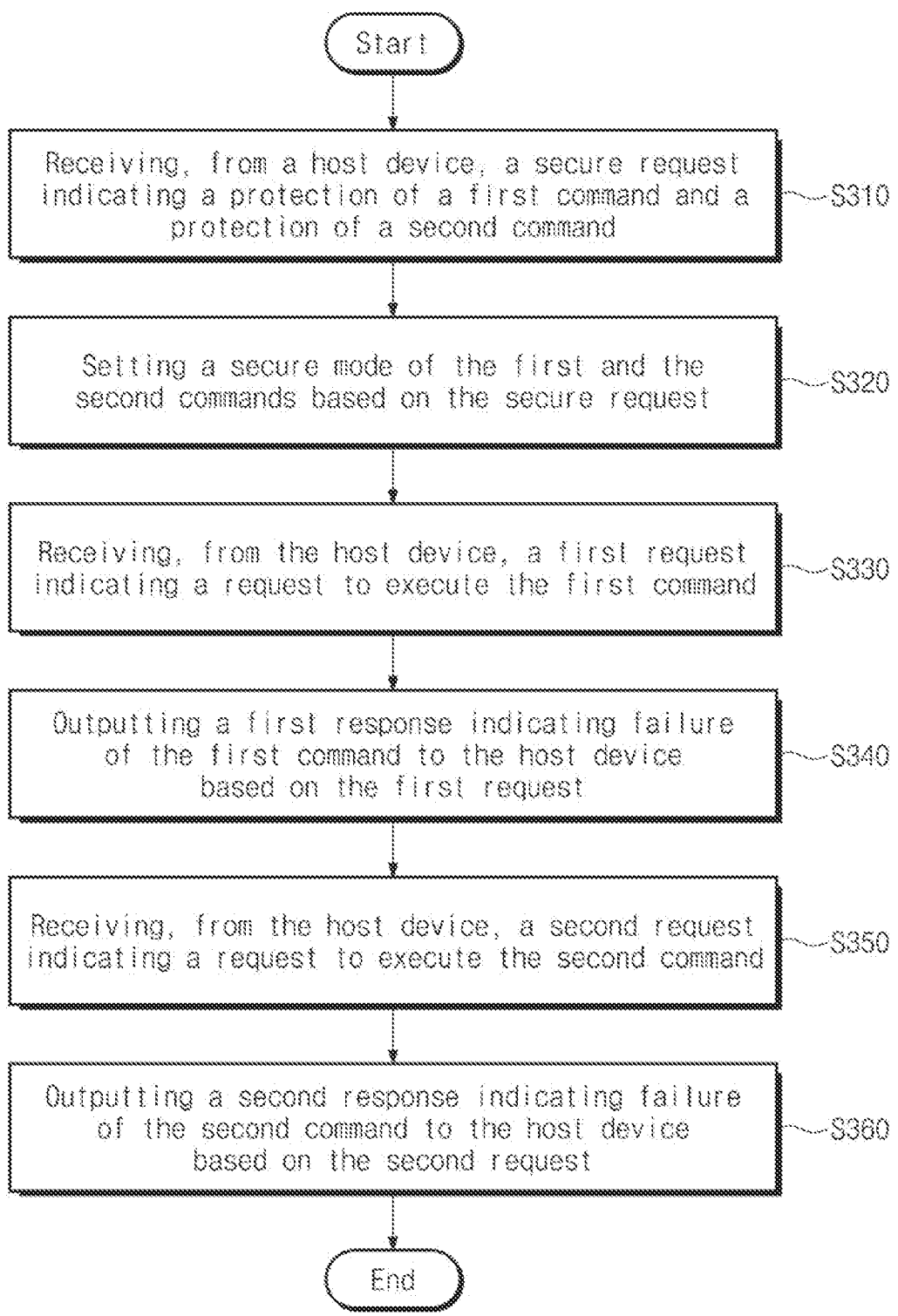
FIG. 16 is a flowchart illustrating an operating method of a storage device, according to some example embodiments of the disclosure.

FIG. 16 is a flowchart describing an operating method of a storage device, according to some example embodiments of the disclosure. An operating method of a storage device will be described with reference to FIG. 16. The storage device may correspond to the storage device 1200 described with reference to FIGS. 1, 2, 4, 5, 8, and 15. The storage device may communicate with a host device. The storage device may be configured to set secure modes of a plurality of commands that are different in kind.

In operation S310, the storage device may receive a secure request indicating a protection of a first command and a protection of a second command from the host device. In some example embodiments, the secure request may be implemented with a request message of the RPMB message of the UFS standard. The secure request may support the secure command protect configuration block. In some example embodiments, each of the first command and the second command may be one of commands, which are executable by the storage device, such as a read command, a write command, a purge command, and an unmap command.

In operation S320, the storage device may set secure modes of the first and second commands based on the secure request. For example, a command in which the secure mode is enabled may not be executed by the storage device, that is, the execution of the command by the storage device may be blocked. A command in which the secure mode is disabled may be executed by the storage device.

In operation S330, the storage device may receive a first request indicating a request to execute the first command, from the host device. In operation S340, the storage device may output a first response indicating failure of the first command to the host device, based on the first request. The failure of the first command may be failure to execute the first command according to the enabling of the secure mode of the first command.

In operation S350, the storage device may receive a second request indicating a request to execute the second command, from the host device. In operation S360, the storage device may output a second response indicating failure of the second command to the host device, based on the second request. The failure of the second command may be failure to execute the second command according to the enabling of the secure mode of the second command.

In some example embodiments, the storage device may set the secure mode in units of logical block address. For example, the secure request in operation S310 may indicate a protection of the first command and a non-protection of the second command in a first logical block address and may indicate a non-protection of the first command and a protection of the second command in a second logical block address. The first request in operation S330 may further indicate a request to execute the first command in the first logical block address. The second request in operation S350 may further indicate a request to execute the second command in the second logical block address.

In this case, when receiving the request to execute the first command in the second logical block address, the storage device may execute the first command in the second logical block address. When receiving the request to execute the second command in the first logical block address, the storage device may execute the second command in the first logical block address. That is, secure modes of a plurality of commands may be independently set in units of logical block address.

In some example embodiments, the storage device may set the secure mode in units of logical unit. For example, the secure request in operation S310 may further indicate a protection of the first command and a protection of the second command in a plurality of logical block addresses included in a first logical unit. The first request in operation S330 may further indicate a request to execute the first command in at least part of the plurality of logical block addresses included in the first logical unit. The second request in operation S350 may further indicate a request to execute the second command in at least part of the plurality of logical block addresses included in the first logical unit.

In some example embodiments, the storage device may set the secure mode in units of memory type. For example, the secure request in operation S310 may further indicate a protection of the first command and a protection of the second command in a plurality of first logical block addresses included in the first logical unit and a plurality of second logical block addresses included in a second logical unit. The first logical unit and the second logical unit may be included in the same memory type. The first request in operation S330 may further indicate a request to execute the first command in at least part of the plurality of first logical block addresses and the plurality of second logical block addresses. The second request in operation S350 may further indicate a request to execute the second command in at least part of the plurality of first logical block addresses and the plurality of second logical block addresses.

Figure 17:
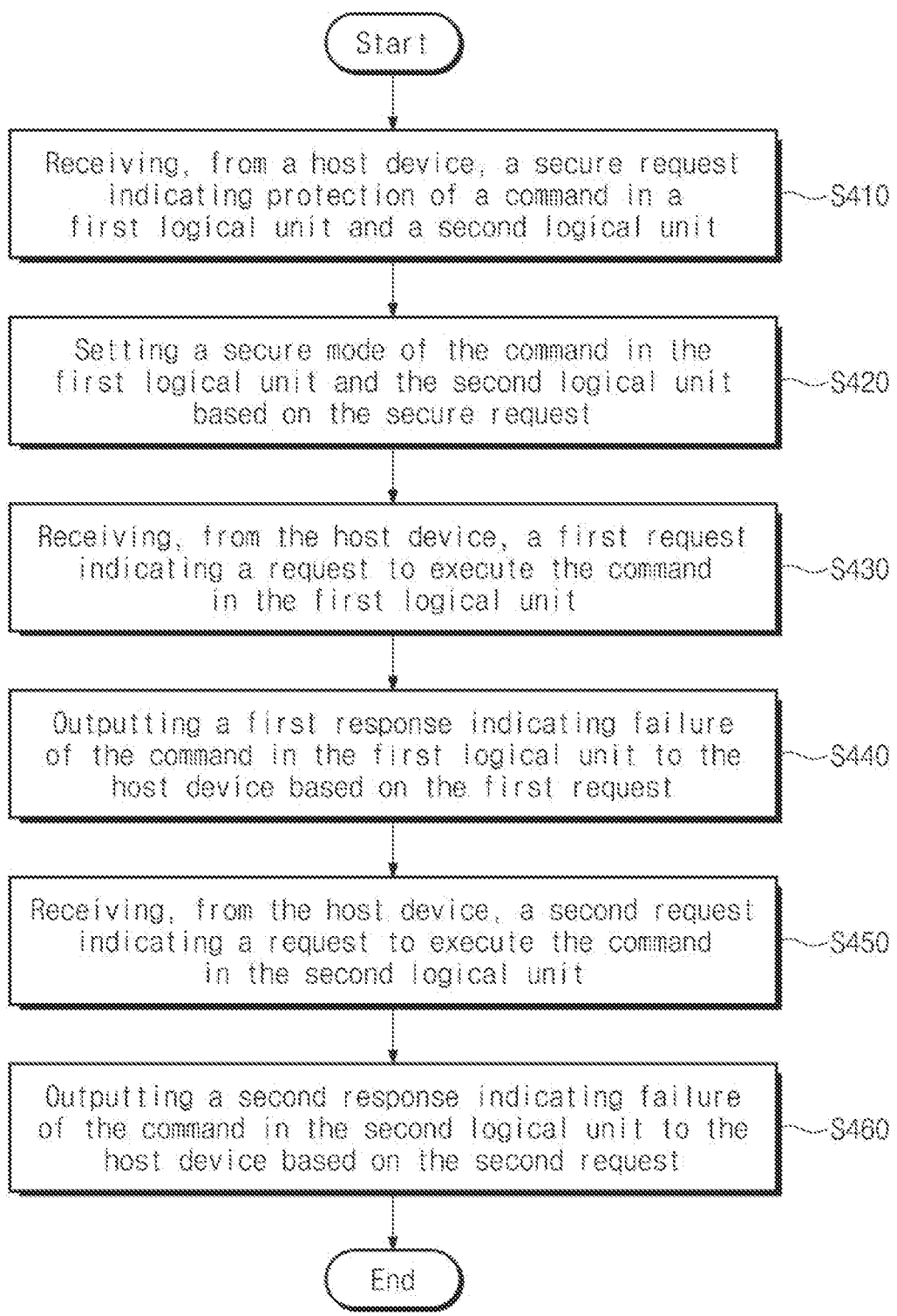
FIG. 17 is a flowchart illustrating an operating method of a storage device, according to some example embodiments of the disclosure.

FIG. 17 is a flowchart illustrating an operating method of a storage device, according to some example embodiments of the disclosure. An operating method of a storage device will be described with reference to FIG. 17. The storage device may correspond to the storage device 1200 described with reference to FIGS. 1, 2, 4, 5, 8, and 15. The storage device may communicate with a host device. The storage device may be configured to set secure modes in a plurality of logical units based on one secure request.

In operation S410, the storage device may receive a secure request indicating a protection of a command in a first logical unit and a second logical unit, from the host device. In operation S420, the storage device may set a secure mode of a command in the first logical unit and the second logical unit, based on the secure request. In some example embodiments, the first logical unit and the second logical unit may be included in the same memory type. For example, in operation S420, a secure mode of a third logical unit included in a memory type different from that of the first logical unit and the second logical unit may not be set.

In operation S430, the storage device may receive a first request indicating a request to execute a command in the first logical unit, from the host device. In operation S440, the storage device may output a first response indicating failure of the command in the first logical unit to the host device, based on the first request.

In operation S450, the storage device may receive a second request indicating a request to execute a command in the second logical unit, from the host device. In operation S460, the storage device may output a second response indicating failure of the command in the second logical unit to the host device, based on the second request.

Figure 18:
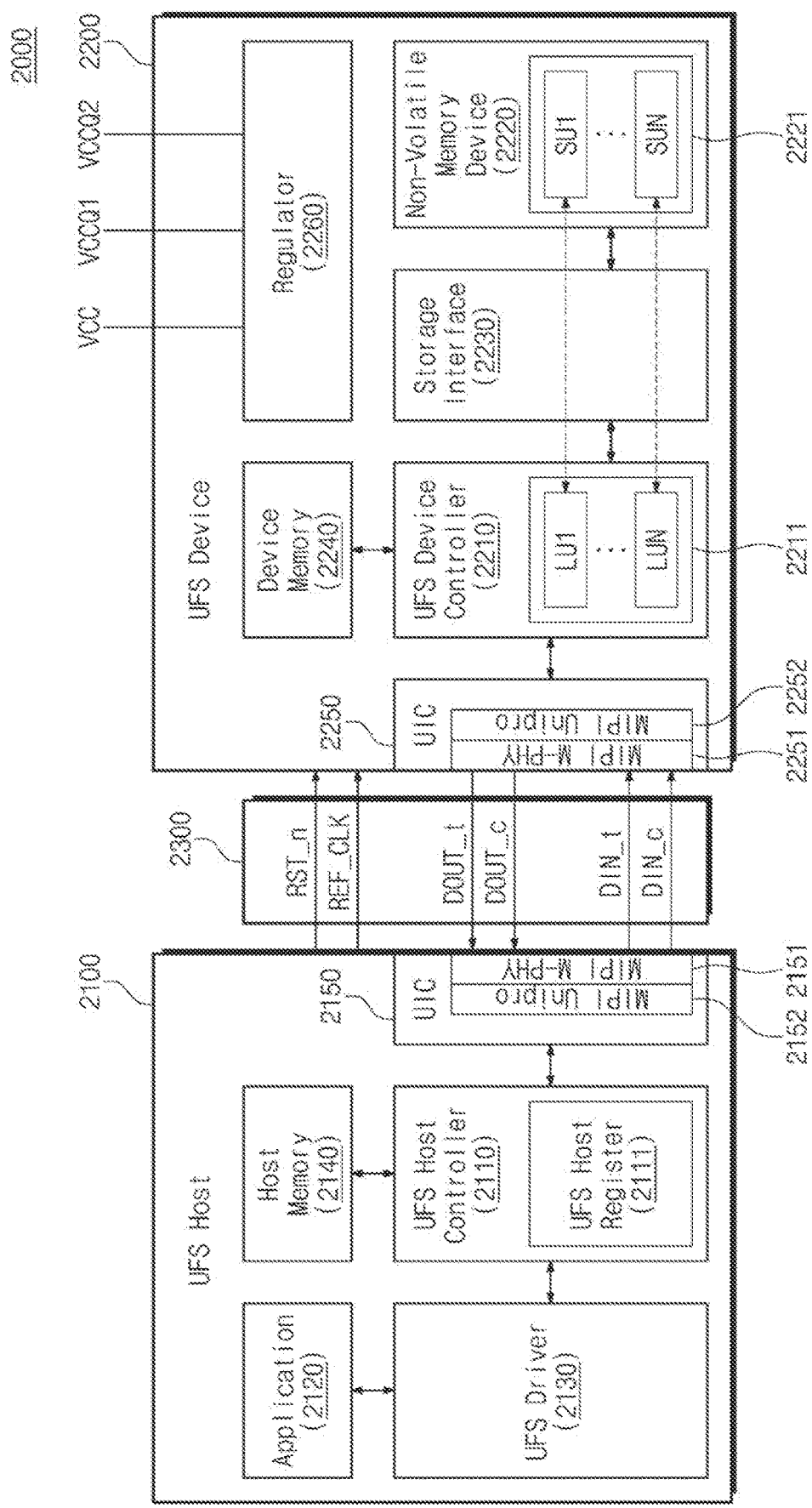
FIG. 18 is a diagram describing a universal flash storage (UFS) system, according to some example embodiments of the disclosure.

FIG. 18 is a diagram describing a UFS system, according to some example embodiments of the disclosure. A UFS system 2000 according to some example embodiments of the disclosure will be described with reference to FIG. 18. The UFS system 2000 that is a system complying with the UFS standard announced by the JEDEC (Joint Electron Device Engineering Council) may include a UFS host 2100, a UFS device 2200, and a UFS interface 2300.

The UFS system 2000 may correspond to the storage system 1000 described with reference to FIGS. 1, 2, and 15. The UFS device 2200 of the UFS system 2000 may correspond to the storage device 1200 described with reference to FIGS. 1, 2, 4, 5, 8, and 15 and may perform the operating methods described with reference to FIGS. 16 and 17.

The UFS host 2100 and the UFS device 2200 may be interconnected through the UFS interface 2300. The UFS host 2100 may include a UFS host controller 2110, an application 2120, an UFS driver 2130, a host memory 2140, and an UFS interconnect (UIC) layer 2150.

The UFS device 2200 may include a UFS device controller 2210, a non-volatile memory device 2220, a storage interface 2230, a device memory 2240, a UIC layer 2250, and a regulator 2260. The non-volatile memory device 2220 may include a plurality of storage units 2221. This storage unit 2221 may include a 2D NAND flash memory or a 3D V-NAND flash memory or may include another kind of non-volatile memories such as a PRAM and/or an RRAM. The UFS device controller 2210 and the non-volatile memory device 2220 may be interconnected through the storage interface 2230. The storage interface 2230 may be implemented to comply with the standard such as Toggle or ONFI (Open NAND Flash Interface).

The application 2120 may include a program that requires the communication with the UFS device 2200 to use a function of the UFS device 2200. For an input/output associated with the UFS device 2200, the application 2120 may transmit an input-output request IOR to the UFS driver 2130. The input-output request IOR may include a data read request, a data write request, and/or a data erase request, but is not limited thereto.

The UFS driver 2130 may manage the UFS host controller 2110 through an UFS-HCI (Host Controller Interface). The UFS driver 2130 may convert an input-output request generated by the application 2120 into an UFS command defined by the UFS standard and may transmit the UFS command to the UFS host controller 2110. One input-output request may be converted into a plurality of UFS commands. In general, the UFS command may be a command defined by the SCSI standard. However, the UFS command may be a UFS standard dedicated command.

The UFS host controller 2110 may transmit the UFS command converted by the UFS driver 2130 to the UIC layer 2250 of the UFS device 2200 through the UIC layer 2150 of the UFS host controller 2110 and the UFS interface 2300. In this process, a UFS host register 2111 of the UFS host controller 2110 may perform a role of a command queue (CQ).

The UIC layer 2150 of the UFS host 2100 may include an MIPI M-PHY 2151 and an MIPI UniPro 2152, and the UIC layer 2250 of the UFS device 2200 may also include an MIPI M-PHY 2251 and an MIPI UniPro 2252.

The UFS interface 2300 may include a line configured to transmit a reference clock REF_CLK, a line configured to transmit a hardware reset signal RST_n for the UFS device 2200, a pair of lines configured to transmit a differential input signal pair DIN_t and DIN_c, and a pair of lines configured to transmit a differential output signal pair DOUT_t and DOUT_c.

A frequency value of the reference clock REF_CLK that is provided from the UFS host 2100 to the UFS device 2200 may be one of the following frequency values: 19.2 MHz, 26 MHz, 38.4 MHz, and 52 MHz. However, the disclosure is not limited thereto. The UFS host 2100 may change a frequency value of the reference clock REF_CLK even in operation, that is, even while data are exchanged between the UFS host 2100 and the UFS device 2200. The UFS device 2200 may generate clocks of various frequencies from the reference clock REF_CLK provided from the UFS host 2100, by using a phase-locked loop (PLL) or the like. Also, the UFS host 2100 may set a value of a data rate between the UFS host 2100 and the UFS device 2200 through a frequency value of the reference clock REF_CLK. That is, a value of the data rate may be determined depending on a frequency value of the reference clock REF_CLK.

The UFS interface 2300 may support multiple lanes, and each lane may be implemented with a differential pair. For example, the UFS interface 2300 may include one or more receive lanes and one or more transmit lanes. In FIG. 18, a pair of lines configured to transmit the differential input signal pair DIN_t and DIN_c may constitute a receive lane, and a pair of lines configured to transmit the differential output signal pair DOUT_t and DOUT_c may constitute a transmit lane. One transmit lane and one receive lane are illustrated in FIG. 18, but the number of transmit lanes and the number of receive lanes may be changed.

The receive lane and the transmit lane may allow data transmission in a serial communication manner, and a structure in which the receive lane and the transmit lane are separated from each other makes it possible for the UFS host 2100 and the UFS device 2200 to communicate with each other in a full-duplex manner. That is, even while the UFS device 2200 receives data from the UFS host 2100 through the receive lane, the UFS device 2200 may transmit data to the UFS host 2100 through the transmit lane. Also, control data from the UFS host 2100 to the UFS device 2200, such as a command, and user data that the UFS host 2100 intends to store in the non-volatile memory device 2220 of the UFS device 2200 or intends to read from the non-volatile memory device 2220 may be provided through the same lane. As such, except for one receive lane and one transmit lane, a separate lane for data transmission does not need to be further provided between the UFS host 2100 and the UFS device 2200.

The UFS device controller 2210 of the UFS device 2200 may overall control an operation of the UFS device 2200. The UFS device controller 2210 may manage the non-volatile memory device 2220 through the logical unit (LU) 2211 being a logical data storage unit. The number of logical units 2211 may be "8", but is not limited to. The UFS device controller 2210 may include a flash translation layer (FTL), and may translate a logical data address (e.g., an LBA) provided from the UFS host 2100 into a physical data address (e.g., a physical block address (PBA)) by using address mapping information of the FTL. In the UFS system 2000, a logical block for storing user data may have a size of a given range. For example, a minimum size of the logical block may be set to 4 Kbytes.

When a command from the UFS host 2100 is input to the UFS device 2200 through the UIC layer 2250, the UFS device controller 2210 may perform an operation corresponding to the input command; when the operation is completed, the UFS device controller 2210 may transmit a complete response to the UFS host 2100.

In an example embodiment, when the UFS host 2100 intends to store user data in the UFS device 2200, the UFS host 2100 may transmit a data write command to the UFS device 2200. When a ready-to-transfer response (e.g., ready-to-transfer UPIU) is received from the UFS device 2200, the UFS host 2100 may transmit the user data to the UFS device 2200. The UFS device controller 2210 may temporarily store the received user data in the device memory 2240, and may store the user data temporarily stored in the device memory 2240 at a selected location of the non-volatile memory device 2220 based on the address mapping information of the FTL.

For another example, when the UFS host 2100 intends to read user data stored in the UFS device 2200, the UFS host 2100 may transmit a data read command to the UFS device 2200. When the UFS device controller 2210 receives the data read command, based on the data read command, the UFS device controller 2210 may read the user data from the non-volatile memory device 2220 and may temporarily store the read user data in the device memory 2240. In this read process, the UFS device controller 2210 may detect and correct an error of the read user data by using an embedded error correction code (ECC) engine (not illustrated). In more detail, the ECC engine may generate parity bits for write data to be written in the non-volatile memory device 2220, and the parity bits thus generated may be stored in the non-volatile memory device 2220 together with the write data. When data are read from the non-volatile memory device 2220, the ECC engine may correct an error of the read data by using parity bits read from the non-volatile memory device 2220 together with the read data and may output the error-corrected read data.

The UFS device controller 2210 may transmit the user data temporarily stored in the device memory 2240 to the UFS host 2100. In addition, the UFS device controller 2210 may further include an advanced encryption standard (AES) engine (not illustrated). The AES engine may perform at least one of an encryption operation and a decryption operation on data input to the UFS device controller 2210 by using a symmetric-key algorithm.

The UFS host 2100 may store commands to be transmitted to the UFS device 2200 in the UFS host register 2111, which is capable of functioning as a command queue, depending on an order and may transmit the commands to the UFS device 2200 depending on the order. In this case, even while the previous command is still being processed by the UFS device 2200, that is, even before a notification indicating that the previous command is completely processed by the UFS device 2200 is received, the UFS host 2100 may transmit a next command pending in the command queue to the UFS device 2200. As such, the UFS device 2200 may receive the next command from the UFS host 2100 even while processing the previous command. The maximum number of commands capable of being stored in the command queue, that is, a queue depth may be, for example, 32. Also, the command queue may be implemented in the form of a circular queue indicating a start and an end of commands enqueued therein through a head pointer and a tail pointer, respectively.

Each of the plurality of storage units 2221 may include a memory cell array (not illustrated) and a control circuit (not illustrated) controlling an operation of the memory cell array. The memory cell array may include a two-dimensional memory cell array or a three-dimensional memory cell array. The memory cell array may include a plurality of memory cells, and each of the memory cells may be a single level cell (SLC) that stores 1-bit information. However, each of the memory cells may be implemented with a memory cell, which stores information of 2 or more bits, such as a multi-level cell (MLC), a triple level cell (TLC), or a quadruple level cell (QLC). The three-dimensional memory cell array may include a vertical NAND string vertically oriented such that at least one memory cell is located above another memory cell.

The UFS device 2200 may receive VCC, VCCQ1, VCCQ2, etc. as power supply voltages. The "VCC" that is a main power supply voltage for the UFS device 2200 may have a value of 2.4 to 3.6 V. The "VCCQ1" that is a power supply voltage for supplying a voltage of a low range may be mainly for the UFS device controller 2210 and may have a value of 1.14 to 1.26 V. The "VCCQ2" that is a power supply voltage for supplying a voltage of a range lower than the "VCC" and higher than the "VCCQ1" may mainly be for an input/output interface such as the MIPI M-PHY 2251 and may have a value of 1.7 to 1.95 V. The "VCC", "VCCQ1", and "VCCQ2" may be supplied for respective components of the UFS device 2200 through the regulator 2260.

Figure 19:
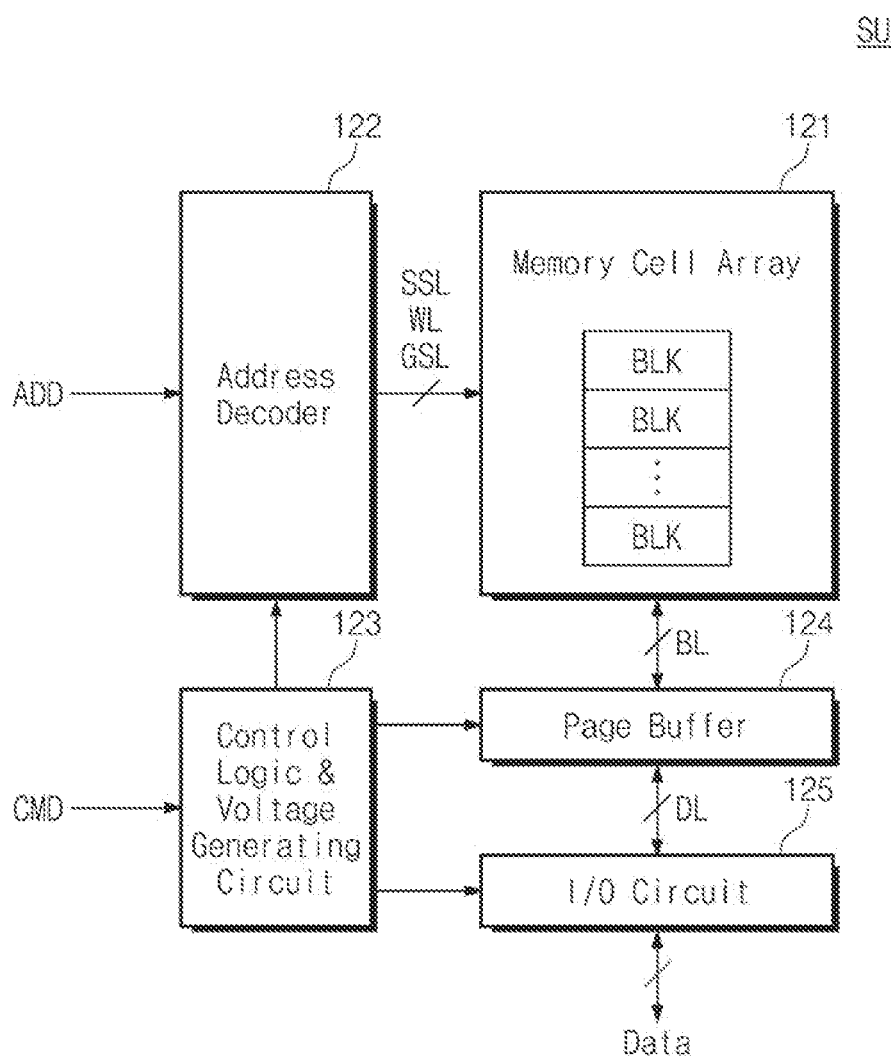
FIG. 19 is a diagram illustrating a storage unit of FIG. 18 in detail, according to some example embodiments of the disclosure.
Figure 20:
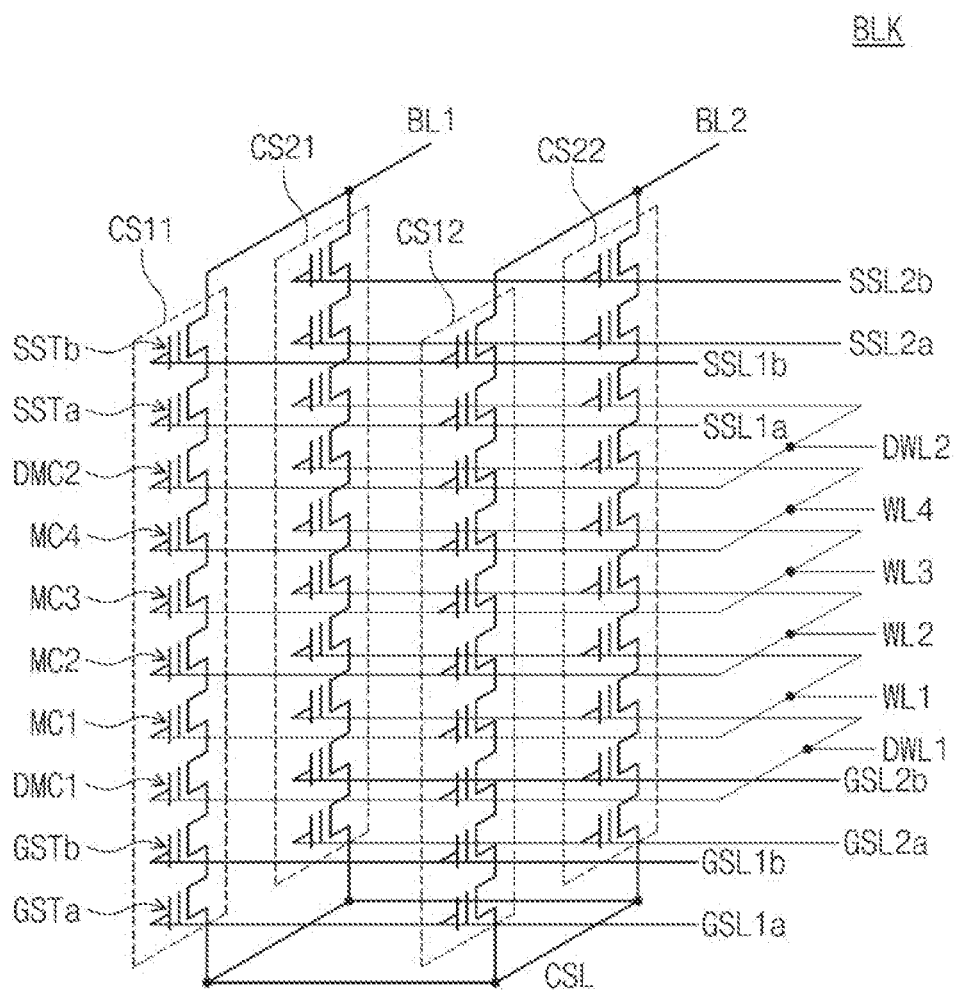
FIG. 20 is a diagram illustrating a memory block of FIG. 19 in detail, according to some example embodiments of the disclosure.

FIG. 19 is a diagram illustrating a storage unit of FIG. 18 in detail, according to some example embodiments of the disclosure. FIG. 20 is a diagram illustrating a memory block of FIG. 19 in detail, according to some example embodiments of the disclosure.

Referring to FIGS. 18, 19, and 20, the non-volatile memory device 2220 may include the plurality of storage units 2221. The plurality of storage units 2221 may correspond to first to N-th storage units SU1 to SUN, and "N" may be a random natural number. A storage unit SU of FIG. 19 may correspond to one of the plurality of storage units SU1 to SUN of FIG. 18. The storage unit SU may receive an address ADD and a command CMD from the UFS device controller 2210. The storage unit SU may exchange data with the UFS device controller 2210.

The storage unit SU may include a memory cell array 121, an address decoder 122, a control logic and voltage generating circuit 123, a page buffer 124, and an input/output (I/O) circuit 125.

The memory cell array 121 may include a plurality of memory blocks BLK for storing data. Each of the plurality of memory blocks BLK may be similar in structure to a memory block BLK illustrated in FIG. 20. The memory block BLK illustrated in FIG. 20 may correspond to a physical erase unit of the non-volatile memory device 2220, but the disclosure is not limited thereto. For example, the physical erase unit may be changed to a page unit, a word line unit, a sub-block unit, etc.

As illustrated in FIG. 20, the memory block BLK may include a plurality of cell strings CS11, CS12, CS21, and CS22. The plurality of cell strings CS11, CS12, CS21, and CS22 may be arranged in a row direction and a column direction. For brevity of drawing, four cell strings CS11, CS12, CS21, and CS22 are illustrated in FIG. 20, but the disclosure is not limited thereto. For example, the number of cell strings may increase or decrease in the row direction or the column direction.

Cell strings placed at the same column from among the plurality of cell strings CS11, CS12, CS21, and CS22 may be connected with the same bit line. For example, the cell strings CS11 and CS21 may be connected with a first bit line BL1, and the cell strings CS12 and CS22 may be connected with a second bit line BL2. Each of the plurality of cell strings CS11, CS12, CS21, and CS22 may include a plurality of cell transistors. Each of the plurality of cell transistors may be implemented with a charge trap flash (CTF) memory cell. The plurality of cell transistors may be stacked in a height direction that is a direction perpendicular to a plane (e.g., a semiconductor substrate (not illustrated)) defined by the row direction and the column direction.

The plurality of cell transistors may be connected in series between the corresponding bit line (e.g., BL1 or BL2) and a common source line CSL. For example, the plurality of cell transistors may include string selection transistors SSTa and SSTb, dummy memory cells DMC1 and DMC2, memory cells MC1 to MC4, and ground selection transistors GSTa and GSTb. The serially-connected string selection transistors SSTa and SSTb may be provided between the serially-connected memory cells MC1 to MC4 and a corresponding bit line (e.g., BL1 and BL2). The serially-connected ground selection transistors GSTa and GSTb may be provided between the serially-connected memory cells MC1 to MC4 and the common source line CSL.

In some example embodiments, the second dummy memory cell DMC2 may be provided between the serially-connected string selection transistors SSTa and SSTb and the serially-connected memory cells MC1 to MC4, and the first dummy memory cell DMC1 may be provided between the serially-connected memory cells MC1 to MC4 and the serially-connected ground selection transistors GSTa and GSTb.

In the plurality of cell strings CS11, CS12, CS21, and CS22, memory cells placed at the same height from among the memory cells MC1 to MC4 may share the same word line. For example, the first memory cells MC1 of the plurality of cell strings CS11, CS12, CS21, and CS22 may be placed at the same height from the substrate (not illustrated) and may share a first word line WL1. The second memory cells MC2 of the plurality of cell strings CS11, CS12, CS21, and CS22 may be placed at the same height from the substrate (not illustrated) and may share a second word line WL2. Likewise, the third memory cells MC3 of the plurality of cell strings CS11, CS12, CS21, and CS22 may be placed at the same height from the substrate (not illustrated) and may share a third word line WL3, and the fourth memory cells MC4 of the plurality of cell strings CS11, CS12, CS21, and CS22 may be placed at the same height from the substrate (not illustrated) and may share a fourth word line WL4.

Dummy memory cells placed at the same height from among the dummy memory cells DMC1 and DMC2 of the plurality of cell strings CS11, CS12, CS21, and CS22 may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

String selection transistors placed at the same height and the same row from among the string selection transistors SSTa and SSTb of the plurality of cell strings CS11, CS12, CS21, and CS22 may share the same string selection line. For example, the string selection transistors SSTb of the cell strings CS11 and CS12 may share a string selection line SSL1b, and the string selection transistors SSTa of the cell strings CS11 and CS12 may share a string selection line SSL1a. The string selection transistors SSTb of the cell strings CS21 and CS22 may share a string selection line SSL2b, and the string selection transistors SSTa of the cell strings CS21 and CS22 may share a string selection line SSL2a.

Ground selection transistors placed at the same height and the same row from among the ground selection transistors GSTa and GSTb of the plurality of cell strings CS11, CS12, CS21, and CS22 may share the same ground selection line. For example, the ground selection transistors GSTb of the cell strings CS11 and CS12 may be connected with a ground selection line GSL1b, and the ground selection transistors GSTa of the cell strings CS1 and CS12 may be connected with a ground selection line GSL1a. The ground selection transistors GSTb of the cell strings CS21 and CS22 may be connected with a ground selection line GSL2b, and the ground selection transistors GSTa of the cell strings CS21 and CS22 may be connected with a ground selection line GSL2a.

In some example embodiments, the memory block BLK illustrated in FIG. 20 is an example. For example, the number of cell strings may increase or decrease, and the number of rows of cell strings and the number of columns of cell strings may increase or decrease depending on the number of cell strings. Also, in the memory block BLK, the number of cell transistors may increase or decrease, the height of the memory block BLK may increase or decrease depending on the number of cell transistors, and the number of lines connected with the cell transistors may increase or decrease depending on the number of cell transistors.

In some example embodiments, the memory block BLK may include a plurality of memory pages. For example, the first memory cells MC1 of the cell strings CS11, CS12, CS21, and CS22 connected with the first word lines WL1 may be referred to as a "first physical page". In some example embodiments, one physical page may correspond to a plurality of logical pages. For example, in the case where the first memory cell MC1 is a triple level cell (TLC) storing information corresponding to three bits, a physical page may correspond to three logical pages.

Referring again to FIGS. 18 and 19, the control logic and voltage generating circuit 123 may receive the command CMD. The command CMD may refer to a signal directing an operation to be performed by the non-volatile memory device 2220, such as a read operation or a write operation. The control logic and voltage generating circuit 123 may control the address decoder 122, the page buffer 124, and the I/O circuit 125. The control logic and voltage generating circuit 123 may provide the address decoder 122 with a voltage corresponding to the command CMD.

The address decoder 122 may receive the address ADD. The address decoder 122 may decode the address ADD. The address decoder 122 may be connected with the memory cell array 121 through string selection lines SSL, word lines WL, and ground selection lines GSL. The address decoder 122 may control voltages to be applied to the string selection lines SSL, the word lines WL, and the ground selection lines GSL based on a decoding result and a voltage received from the control logic and voltage generating circuit 123.

The page buffer 124 may be connected with the memory cell array 121 through bit lines BL. The page buffer 124 may read data from the memory cell array 121 in units of page, by sensing voltages of the bit lines BL. The page buffer 124 may output the read data to the I/O circuit 125 through data lines DL.

The page buffer 124 may receive write data from the I/O circuit 125. The page buffer 124 may store the write data in the memory cell array 121 in units of page.

The I/O circuit 125 may be connected with the page buffer 124 through the data lines DL. The I/O circuit 125 may provide data received from the UFS device controller 2210 to the page buffer 124 through the data lines DL. The I/O circuit 125 may output data received through the data lines DL to the UFS device controller 2210.

According to an example embodiment of the disclosure, an operating method of a storage device to set a secure mode of a command, and an operating method of a storage system including the storage device are provided.

Also, an operating method of a storage device, which protects data from a malicious user and provides a flexible secure environment with respect to various ranges of memory regions and various kinds of commands, and an operating method of a storage system including the storage device are provided.

According to example embodiments, a security mode may be set for a range of a memory region by various units. For example, a unit of a memory region in which the secure mode is set may be a unit of a memory type, a unit of a logical unit, or a unit of a logical block address.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the disclosure has been described with reference to example embodiments thereof, it will be apparent to those of ordinary skill in the art that various changes and modifications may be made thereto without departing from the spirit and scope of the disclosure as set forth in the following claims and their equivalents.

What is claimed is:

1. A method of operating a storage device to set a secure mode of a plurality of commands, the method comprising:
receiving a secure request indicating a protection of a first command and a protection of a second command, from a host device configured to communicate with the storage device, the first command and the second command being different in kind;
setting secure modes of the first command and the second command, based on the secure request;
receiving a first request indicating a request to execute the first command, from the host device;
outputting a first response indicating a failure of the first command to the host device, based on the first request;
receiving a second request indicating a request to execute the second command, from the host device; and
outputting a second response indicating a failure of the second command to the host device, based on the second request,
wherein a data field of the secure request includes a secure command protect configuration block, and
wherein the secure command protect configuration block includes an index, the index indicating a range in which the secure modes of the first command and the second command are to be set and whether the range to be set is in a unit corresponding to a logical block address (LBA), a logical unit (LU), or a memory type.

2. The method of claim 1, wherein the secure request is based on a request message of a replay protect memory block (RPMB) message of a universal flash storage (UFS)

standard, and the secure request supports a secure command protect configuration block (SCPCB).

3. The method of claim 1, wherein the first command is one of a read command, a write command, a purge command, and an unmap command, and
wherein the second command is another one of the read command, the write command, the purge command, and the unmap command.

4. The method of claim 1, wherein the secure request further indicates a protection of the first command in a first logical block address (LBA) and a non-protection of the first command in a second LBA different from the first LBA, and
wherein the first request further indicates a request to execute the first command in the first LBA.

5. The method of claim 4, further comprising:
receiving a third request indicating a request to execute the first command in the second LBA, from the host device; and
executing the first command in the second LBA, based on the third request.

6. The method of claim 4, wherein the secure request further indicates a non-protection of the second command in the first LBA and a protection of the second command in the second LBA,
wherein the second request further indicates a request to execute the second command in the second LBA, and
wherein the method further comprises:
receiving a fourth request indicating a request to execute the second command in the first LBA, from the host device; and
executing the second command in the first LBA, based on the fourth request.

7. The method of claim 1, wherein the secure request further indicates a protection of the first command and a protection of the second command in a plurality of LBAs included in a first logical unit (LU),
wherein the first request further indicates a request to execute the first command in at least part of the plurality of LBAs, and
wherein the second request further indicates a request to execute the second command in at least part of the plurality of LBAs.

8. The method of claim 1, wherein the secure request further indicates a protection of the first command in a plurality of first LBAs included in a first LU and a plurality of second LBAs included in a second LU and a protection of the second command in the plurality of first LBAs included in the first LU and the plurality of second LBAs included in the second LU,
wherein the first LU and the second LU are included in the same memory type,
wherein the first request further indicates a request to execute the first command in at least part of the plurality of first LBAs and the plurality of second LBAs, and
wherein the second request further indicates a request to execute the second command in at least part of the plurality of first LBAs and the plurality of second LBAs.

9. The method of claim 1, wherein a request message type field of the secure request indicates a secure command protect configuration block write request.

10. The method of claim 9, wherein the secure command protect configuration block further includes:
a secure command protect entry indicating whether to protect the first command and whether to protect the second command.

11. The method of claim 1, wherein the index includes one of:
a first index code value indicating an LBA protection operation;
a second index code value indicating an LU protection operation; and
a third index code value indicating a memory type protection operation.

12. The method of claim 10, wherein the secure command protect entry includes:
a command protect flag indicating whether to protect the first command and whether to protect the second command; and
a command protect type that defines a type of controlling the command protect flag.

13. The method of claim 12, wherein the command protect type includes one of:
a first command protect type code value indicating that code values of an existing command protect flag are maintained after a power cycle or a hardware reset;
a second command protect type code value indicating that each of the code values of the command protect flag are set to a first code value after the power cycle or the hardware reset; and
a third command protect type code value indicating that each of the code values of the command protect flag are set to a second code value after the power cycle or the hardware reset.

14. The method of claim 12, wherein the command protect flag includes a plurality of command fields respectively corresponding to the plurality of commands and each of the plurality of command fields indicating whether to protect a corresponding command,
wherein each of the plurality of command fields includes a first code value indicating an enabling of a secure mode of the corresponding command or a second code value indicating a disabling of the secure mode of the corresponding command,
wherein a first command field corresponding to the first command from among the plurality of command fields includes the first code value, and
wherein a second command field corresponding to the second command from among the plurality of command fields includes the first code value.

15. A method of operating a storage device to set a secure mode in a plurality of logical units (LUs), the method comprising:
receiving a secure request indicating a protection of a first command in a first LU and a second LU of the plurality of LUs, from a host device configured to communicate with the storage device;
setting a secure mode of the first command in the first LU and the second LU, based on the secure request;
receiving a first request indicating a request to execute the first command in the first LU, from the host device;
outputting a first response indicating a failure of the first command in the first LU to the host device, based on the first request;
receiving a second request indicating a request to execute the first command in the second LU, from the host device; and
outputting a second response indicating a failure of the first command in the second LU to the host device, based on the second request,
wherein a data field of the secure request includes a secure command protect configuration block, and wherein the secure command protect configuration block includes an index, the index indicating a range in which the secure mode of the first command is to be set and whether the range to be set is in a unit corresponding to a logical block address (LBA), a logical unit (LU), or a memory type.

16. The method of claim 15, further comprising:
receiving a third request indicating a request to execute the first command in a third LU of the plurality of LUs, from the host device; and
executing the first command in the third LU, based on the third request, and
wherein the first LU and the second LU are included in a first memory type, and the third LU is included in a second memory type.

17. The method of claim 15, wherein the secure request further indicates a protection of a second command in the first LU and the second LU, and
wherein the setting the secure mode includes:
setting the secure mode of the first command and a secure mode of the second command in the first LU and the second LU, based on the secure request.

18. The method of claim 17, wherein the first command is one of a read command, a write command, a purge command, and an unmap command, and
wherein the second command is another one of the read command, the write command, the purge command, and the unmap command.

19. A method of operating a storage system, which includes a host device and a storage device configured to communicate with the host device, to set a secure mode of a plurality of commands, the method comprising:
generating, by the host device, a secure request indicating a protection of a first command in a first logical block address (LBA) and a protection of a second command in a second LBA, the first command and the second command being different in kind;
setting, by the storage device, a secure mode based on the secure request;
generating, by the host device, a first request indicating a request to execute the first command in the first LBA;
generating, by the storage device, a first response indicating a failure of the first command, based on the first request;
generating, by the host device, a second request indicating a request to execute the second command in the second LBA; and
generating, by the storage device, a second response indicating a failure of the second command, based on the second request,
wherein a data field of the secure request includes a secure command protect configuration block, and
wherein the secure command protect configuration block includes an index, the index indicating a range in which the secure modes of the first command and the second command are to be set and whether the range to be set is in a unit corresponding to a logical block address (LBA), a logical unit (LU), or a memory type.

20. The method of claim 19, further comprising:
generating, by the host device, a third request indicating a request to execute the first command in the second LBA;
executing, by the storage device, the first command in the second LBA, based on the third request;
generating, by the host device, a fourth request indicating a request to execute the second command in the first LBA; and
executing, by the storage device, the second command in the first LBA, based on the fourth request.

* * * * *